US010560719B2

(12) United States Patent
Chen et al.

(10) Patent No.: US 10,560,719 B2
(45) Date of Patent: Feb. 11, 2020

(54) VIDEO ENCODING AND DECODING METHOD AND APPARATUS

(71) Applicants: Huawei Technologies Co., Ltd., Shenzhen (CN); University of Science and Technology of China, Hefei (CN)

(72) Inventors: Fangdong Chen, Hefei (CN); Sixin Lin, Shenzhen (CN); Houqiang Li, Hefei (CN); Li Li, Hefei (CN)

(73) Assignees: Huawei Technologies Co., Ltd., Shenzhen (CN); University of Science and Technology of China, Hefei (CN)

( * ) Notice: Subject to any disclaimer, the term of this patent is extended or adjusted under 35 U.S.C. 154(b) by 179 days.

(21) Appl. No.: 15/882,346

(22) Filed: Jan. 29, 2018

(65) Prior Publication Data
US 2018/0152728 A1 May 31, 2018

Related U.S. Application Data

(63) Continuation of application No. PCT/CN2015/085586, filed on Jul. 30, 2015.

(51) Int. Cl.
*H04N 19/58* (2014.01)
*H04N 19/124* (2014.01)
*H04N 19/172* (2014.01)

(52) U.S. Cl.
CPC ........... *H04N 19/58* (2014.11); *H04N 19/124* (2014.11); *H04N 19/172* (2014.11)

(58) Field of Classification Search
CPC .... H04N 19/56; H04N 19/523; H04N 19/182; H04N 19/14; H04N 19/57; H04N 19/109;
(Continued)

(56) References Cited

U.S. PATENT DOCUMENTS

| 6,055,330 | A | * | 4/2000 | Eleftheriadis | ........... | G06T 9/007 |
| | | | | | | 382/154 |
| 6,490,319 | B1 | * | 12/2002 | Yang | ..................... | H04N 19/60 |
| | | | | | | 375/240.03 |

(Continued)

FOREIGN PATENT DOCUMENTS

CN 102595135 A 7/2012
CN 102665077 A 9/2012
(Continued)

OTHER PUBLICATIONS

Arachchi et al.,"An Intelligent Rate Control Algorithm to Improve the Video Quality At Scene Transitions for Off-Line MPEG—1/2 Encoders," IEEE Transactions on Consumer Electronics, vol. 49, No. 1, XP001157993, Institute of Electrical and Electronics Engineers, New York, New York, (Feb. 2003).
(Continued)

*Primary Examiner* — James M Pontius
(74) *Attorney, Agent, or Firm* — Leydig, Voit & Mayer, Ltd.

(57) ABSTRACT

A video encoding and decoding method and apparatus are provided. The video encoding method includes: obtaining a first statistical characteristic of previous K frames of images of a video sequence; determining a first background frame; determining, according to the first statistical characteristic, a QP used for encoding the first background frame; encoding the first background frame according to the QP, to obtain a first background long-term reference frame; and encoding the $(K+1)^{th}$ frame of image of the video sequence to the $(K+L)^{th}$ frame of image of the video sequence according to the first background long-term reference frame. When encoding is performed on the $(K+1)^{th}$ frame of image of the video sequence to the $(K+L)^{th}$ frame of image of the video sequence, the used QP for encoding the background long-term reference frame is determined according to the first
(Continued)

statistical characteristic related to video content of the previous K frames of images.

20 Claims, 5 Drawing Sheets

(58) Field of Classification Search
CPC ... H04N 19/139; H04N 19/136; H04N 19/533
See application file for complete search history.

(56) References Cited

U.S. PATENT DOCUMENTS

| | | | | |
|---|---|---|---|---|
| 6,879,723 | B1* | 4/2005 | Helman | H04N 19/176 |
| | | | | 375/240.03 |
| 7,321,624 | B1* | 1/2008 | Allmen | H04N 19/172 |
| | | | | 375/240.08 |
| 9,681,125 | B2* | 6/2017 | Wang | H04N 19/00 |
| 10,070,142 | B2* | 9/2018 | Davies | H04N 19/44 |
| 2007/0092148 | A1* | 4/2007 | Ban | H04N 19/60 |
| | | | | 382/239 |
| 2008/0159385 | A1* | 7/2008 | Joyce | H04N 19/139 |
| | | | | 375/240.03 |
| 2010/0124274 | A1* | 5/2010 | Cheok | H04N 19/176 |
| | | | | 375/240.03 |
| 2012/0275514 | A1 | 11/2012 | Leontaris et al. | |
| 2014/0321545 | A1* | 10/2014 | Wang | H04N 19/577 |
| | | | | 375/240.15 |
| 2014/0376616 | A1 | 12/2014 | Li et al. | |
| 2015/0334398 | A1* | 11/2015 | Socek | G06T 7/11 |
| | | | | 375/240.26 |

FOREIGN PATENT DOCUMENTS

| | | |
|---|---|---|
| CN | 103124354 A | 5/2013 |
| EP | 2224745 A1 | 9/2010 |
| GB | 2501495 A | 10/2013 |
| WO | 2004064373 A2 | 7/2004 |

OTHER PUBLICATIONS

Li et al., "QP Refinement According to Lagrange Multiplier for High Efficiency Video Coding," pp. 477-480, Institute of Electrical and Electronics Engineers, New York, New York (2013).

"Line Transmission on Non-Telephone Signals; Video Codec for Audiovisual Services AT px64 kbit/s," ITU-T Recommendation H.261, Version 1, International Telecommunication Union, Geneva, Switzerland (1990).

"Series H: Audiovisual and Multimedia Systems: Infrastructure of audiovisual services—Coding of moving video, Video coding for low bit rate communication," ITU-T Rec. H.263, International Telecommunication Union, Geneva, Switzerland (Jan. 2005).

"Series H: Audiovisual and Multimedia Systems: Infrastructure of audiovisual services—Coding of moving video, Advanced video coding for generic audiovisual services," ITU-T Rec. H.264, International Telecommunication Union, Geneva, Switzerland (Mar. 2005).

"Joint Call for Proposals on Video Compression Technology," Document VCEG-AM91, Video Coding Experts Group (VCEG) 39th Meeting: Kyoto, JP, International Telecommunication Union, Geneva, Switzerland (Jan. 17-22, 2010).

Li et al,. "Rate-Distortion Optimized Reference Picture Management for High Efficiency Video Coding," IEEE Transactions on Circuits and Systems for Video Technology, vol. 22, No. 12, pp. 1844-1857, Institute of Electrical and Electronics Engineers, New York, New York (Dec. 2012).

Ortega et al., "Rate-Distortion Methods for Image and Video Compression," IEEE Signal Processing Magazine, vol. 15, No. 11, pp. 23-50, Institute of Electrical and Electronics Engineers, New York, New York (Nov. 1998).

Yang et al., "Source distortion temporal propagation model for motion compensated video coding optimization," Proc. IEEE Int. Conf. Multimedia and Expo, Melbourne, Australia, Institute of Electrical and Electronics Engineers, New York, New York pp. 85-90, (2012).

Paul "A Long-Term Reference Frame for Hierarchical B-Picture-Based Video Coding," IEEE Trans. Circuits Syst. Video Technol., vol. 24, No. 10, pp. 1729-1742, Institute of Electrical and Electronics Engineers, New York, New York (Oct. 2014).

* cited by examiner

VIDEO ENCODING AND DECODING METHOD AND APPARATUS

CROSS-REFERENCE TO RELATED APPLICATIONS

This application is a continuation of International Application No. PCT/CN2015/085586, filed on Jul. 30, 2015, the disclosure of which is hereby incorporated by reference in its entirety.

TECHNICAL FIELD

Embodiments of the present disclosure relate to the field of communications technologies, and in particular, to a video encoding and decoding method and apparatus.

BACKGROUND

With rapid development of the Internet and increasingly rich culture lives of people in both material and spiritual fields, there are growing application requirements for videos, especially high definition videos, in the Internet. However, a data amount of the high definition video is quite large. To ensure that the high definition video can be transmitted over the Internet with limited bandwidth, an issue of compression coding of the high definition video needs to be addressed first.

A video is strongly time-correlated, that is, two adjacent frames of images have many similar image blocks. Therefore, in inter prediction of video encoding, for a current block, motion search is usually performed on a reconstructed frame, to find a block that matches the current block best as a reference block. In a High Efficiency Video Coding (HEVC) standard, there are mainly two types of reference frames: a short-term reference frame and a long-term reference frame. The short-term reference frame is generally a reconstructed frame relatively close to a current reference frame, and has a short-term characteristic of a current frame, for example, has a motion foreground of a shape similar to that of the current frame. The long-term reference frame may be a reconstructed frame relatively far away from the current frame, or may be a reference frame obtained by means of synthesis, and has a long-term characteristic of a video sequence segment, for example, has a background frame of the video sequence segment.

In HEVC, for low-latency configuration with a group of picture (GOP for short) length being 4, currently, the short-term reference frame is usually set by using a tiered quantization parameter (QP for short), but there is no effective method for setting a QP for the long-term reference frame.

Currently, in a technology, corresponding encoding is performed on a background frame according to the following formula (1), to obtain a background long-term reference frame:

$$QP_{LT} = \begin{cases} 40 & \text{If } QP_{inter} > 40 \\ \lfloor e^{0.09 \times QP_{inter}} \rfloor & \text{If } 20 \le QP_{inter} \le 40 \\ 4 & \text{If } QP_{inter} < 20 \end{cases} \quad (1)$$

where $\lfloor \ \rfloor$ means a round down operation, $QP_{LT}$ is a QP used for encoding a background frame, and $QP_{inter}$ is a minimum QP for encoding a short-term reference frame: P-frame or B-frame. That is, when the background frame is encoded, the QP for encoding the background frame is obtained according to a quantization parameter for encoding the short-term reference frame: P-frame or B-frame.

In this technology, impact of a video content change is not taken into account when a quantization parameter used for encoding a background frame is determined, and the quantization parameter for encoding the background frame is determined according to only a range of the quantization parameter of the short-term reference frame. As a result, encoding quality is relatively poor when encoding is performed.

SUMMARY

Embodiments of the present disclosure provide a video encoding and decoding method and apparatus, to effectively improve overall video encoding quality.

A first aspect of the embodiments of the present disclosure provides a video encoding method, including:

obtaining a first statistical characteristic of previous K frames of images of a video sequence, where K is a positive integer;

determining a first background frame, where the first background frame is used as a reference when encoding is performed on the $(K+1)^{th}$ frame of image of the video sequence to the $(K+L)^{th}$ frame of image of the video sequence, where L is a positive integer;

determining, according to the first statistical characteristic, a quantization parameter (QP) used for encoding the first background frame;

encoding the first background frame according to the QP, to obtain a first background long-term reference frame; and encoding the $(K+1)^{th}$ frame of image of the video sequence to the $(K+L)^{th}$ frame of image of the video sequence according to the first background long-term reference frame.

With reference to the first aspect of the embodiments of the present disclosure, in a first possible implementation of the first aspect of the embodiments of the present disclosure, the determining, according to the first statistical characteristic, a quantization parameter (QP) used for encoding the first background frame includes:

calculating, according to the first statistical characteristic, a first probability that an image block in each of the $(K+1)^{th}$ frame of image of the video sequence to the $(K+L)^{th}$ frame of image of the video sequence uses the first background frame as a reference; and calculating, according to the first probability, the QP used for encoding the first background frame.

With reference to the first aspect or the first possible implementation of the first aspect of the embodiments of the present disclosure, in a second possible implementation of the first aspect of the embodiments of the present disclosure, the first statistical characteristic includes a variance of K centroid values corresponding to K image blocks and an average coding distortion of K coding distortions corresponding to the K image blocks, where the K image blocks are image blocks located at same locations in all of the previous K frames of images, the variance of the K centroid values is a variance of a centroid value sequence constituted by the K centroid values, and the average coding distortion of the K coding distortions is an average value of a coding distortion sequence constituted by the K coding distortions.

With reference to the second possible implementation of the first aspect of the embodiments of the present disclosure, in a third possible implementation of the first aspect of the embodiments of the present disclosure, the K image blocks are the $i^{th}$ image blocks in all of the previous K frames of images, where i is a positive integer; and the obtaining a first statistical characteristic of previous K frames of images of the video sequence includes:

performing iteration calculation according to an order from the second frame of image of the previous K frames of images to the $K^{th}$ frame of image of the previous K frames of images, to obtain the variance of the K centroid values corresponding to the $i^{th}$ image blocks in all of the previous K frames of images, and the average coding distortion of the K coding distortions corresponding to the $i^{th}$ image blocks in all of the previous K frames of images, where the iteration calculation includes:

determining whether the $i^{th}$ image block in the $j^{th}$ frame of image of the video sequence belongs to a background region; and when the $i^{th}$ image block in the $j^{th}$ frame of image of the video sequence belongs to the background region, obtaining, according to $B_{j,i}=B_{j-1,i}+1$, a quantity $B_{j,i}$ of image blocks that are of previous j image blocks and that belong to the background region, where the previous j image blocks are the $i^{th}$ image blocks in all of previous j frames of images of the video sequence; and calculating, according to $B_{j,i}$, a variance of j centroid values corresponding to the $i^{th}$ image blocks in all of the previous j frames of images and an average coding distortion of j coding distortions corresponding to the $i^{th}$ image blocks in all of the previous j frames of images, where $K \geq j \geq 2$, and when the $i^{th}$ image block in the first frame of image of the video sequence belongs to the background region, $B_{1,i}$ is 1, or when the $i^{th}$ image block in the first frame of image of the video sequence does not belong to the background region, $B_{1,i}$ is 0; or when the $i^{th}$ image block in the $j^{th}$ frame of image of the video sequence does not belong to the background region, obtaining, according to $B_{j,i}=B_{j-1,i}$, a quantity $B_{j,i}$ of image blocks that are of previous j image blocks and that belong to the background region, where the previous j image blocks are the $i^{th}$ image blocks in all of previous j frames of images, using a variance of j-1 centroid values corresponding to the $i^{th}$ image blocks in all of previous j-1 frames of images of the video sequence as a variance of j centroid values corresponding to the $i^{th}$ image blocks in all of the previous j frames of images, and using an average coding distortion of j-1 coding distortions corresponding to the $i^{th}$ image blocks in all of the previous j-1 frames of images of the video sequence as an average coding distortion of j coding distortions corresponding to the $i^{th}$ image blocks in all of the previous j frames of images of the video sequence, where when j is 2, the variance of the j-1 centroid values corresponding to the $i^{th}$ image blocks in all of the previous j-1 frames of images is a first preset value, and the average coding distortion of the j-1 coding distortions corresponding to the $i^{th}$ image blocks in all of the previous j-1 frames of images is a second preset value or a coding distortion of the first frame of image of the video sequence.

With reference to the third possible implementation of the first aspect of the embodiments of the present disclosure, in a fourth possible implementation of the first aspect of the embodiments of the present disclosure, the determining whether the $i^{th}$ image block in the $j^{th}$ frame of image of the video sequence belongs to a background region includes:

determining whether a horizontal component of a minimum motion vector in motion vectors of an image subblock of the $i^{th}$ image block in the $j^{th}$ frame of image is less than a first preset threshold, and whether a vertical component of the minimum motion vector is less than a second preset threshold; and when the horizontal component is less than the first preset threshold, and the vertical component is less than the second preset threshold, determining that the $i^{th}$ image block in the $j^{th}$ frame of image belongs to the background region; or when the horizontal component is not less than the first preset threshold or the vertical component is not less than the second preset threshold, determining that the $i^{th}$ image block in the $j^{th}$ frame of image does not belong to the background region.

With reference to the third possible implementation of the first aspect or the fourth possible implementation of the first aspect of the embodiments of the present disclosure, in a fifth possible implementation of the first aspect of the embodiments of the present disclosure, the calculating, according to $B_{j,i}$, a variance of j centroid values corresponding to the $i^{th}$ image blocks in all of the previous j frames of images and an average coding distortion of j coding distortions corresponding to the $i^{th}$ image blocks in all of the previous j frames of images includes:

obtaining a centroid value and a coding distortion of the $i^{th}$ image block in the $j^{th}$ frame of image;

calculating, according to the centroid value of the $i^{th}$ image block in the $j^{th}$ frame of image and $B_{j,i}$, the variance of the j centroid values corresponding to the $i^{th}$ image blocks in all of the previous j frames of images; and calculating, according to the coding distortion of the $i^{th}$ image block in the $j^{th}$ frame of image and $B_{j,i}$, the average coding distortion of the j coding distortions corresponding to the $i^{th}$ image blocks in all of the previous j frames of images.

With reference to the fifth possible implementation of the first aspect of the embodiments of the present disclosure, in a sixth possible implementation of the first aspect of the embodiments of the present disclosure, the calculating, according to the centroid value of the $i^{th}$ image block in the $j^{th}$ frame of image and $B_{j,i}$, the variance of the j centroid values corresponding to the $i^{th}$ image blocks in all of the previous j frames of images includes:

calculating, by using the following formula, the variance of the j centroid values corresponding to the $i^{th}$ image blocks in all of the previous j frames of images:

$$\mu_{j,i} = \begin{cases} \omega_{j,i}, & B_{j,i} = 1 \\ \dfrac{1}{B_{j,i}}((B_{j,i}-1)\mu_{j-1,i} + \omega_{j,i}), & B_{j,i} > 1 \end{cases} ; \text{and}$$

$$\sigma_{j,i}^2 = \begin{cases} 0, & B_{j,i} = 1 \\ \dfrac{(B_{j,i}-1)\sigma_{j-1,i}^2 + (\omega_{j,i} - \mu_{j-1,i})^2}{B_{j,i}} - (\mu_{j-1,i} - \mu_{j,i})^2, & B_{j,i} > 1 \end{cases},$$

where $\mu_{j,i}$ is an average value of centroid values of the previous j image blocks, $\mu_{j-1,i}$ is an average value of centroid values of the previous j-1 image blocks, $\omega_{j,i}$ is a centroid value of the $i^{th}$ image block in the $j^{th}$ frame of image, $\sigma_{j,i}^1$ is a variance of the centroid values of the previous j image blocks, $\sigma_{j-1,i}^2$ is a variance of the centroid values of the previous j-1 image blocks, and the previous j-1 image blocks are the $i^{th}$ image blocks in all of the previous j-1 frames of images.

With reference to the fifth possible implementation of the first aspect or the sixth possible implementation of the first aspect of the embodiments of the present disclosure, in a seventh possible implementation of the first aspect of the embodiments of the present disclosure, the calculating, according to the coding distortion of the $i^{th}$ image block in the $j^{th}$ frame of image and $B_{j,i}$, the average coding distortion of the j coding distortions corresponding to the $i^{th}$ image blocks in all of the previous j frames of images includes:

calculating, by using the following formula, the average coding distortion of the j coding distortions corresponding to the $i^{th}$ image blocks in all of the previous j frames of images:

$$e_{j,i}^2 = \begin{cases} d_{j,i}^2, & B_{j,i} = 1 \\ \frac{1}{B_{j,i}}((B_{j,i} - 1)e_{j-1,i}^2 + d_{j,i}^2), & B_{j,i} > 1 \end{cases},$$

where $d_{j,i}^2$ is a coding distortion of the $i^{th}$ image block in the jth frame of image, $e_{j,i}^2$ is an average coding distortion of the previous j image blocks, and $e_{j-1,i}^2$ is an average coding distortion of the previous j−1 image blocks.

With reference to the third possible implementation of the first aspect to the seventh possible implementation of the first aspect of the embodiments of the present disclosure, in an eighth possible implementation of the first aspect of the embodiments of the present disclosure, the calculating, according to the first statistical characteristic, a first probability that an image block in each of the $(K+1)^{th}$ frame of image of the video sequence to the $(K+L)^{th}$ frame of image of the video sequence uses the first background frame as a reference includes:

calculating the first probability by using the following formula:

$$P_i = \int_{\frac{e_i}{\sigma_i}}^{\frac{e_i}{\sigma_i}} \frac{1}{\sqrt{2\pi}} \exp\left(-\frac{x^2}{2}\right) dx,$$

where $P_i$ is a probability that the $i^{th}$ image block in each of the $(K+1)^{th}$ frame of image of the video sequence to the $(K+L)^{th}$ frame of image of the video sequence uses the $i^{th}$ image block in the first background frame as a reference, $$e_i = \sqrt{e_{B_{K,i},i}^2},$$

and $$\sigma_i = \sqrt{\sigma_{B_{K,i},i}^2},$$

where $e_{B_{K,i},i}^2$ is an average coding distortion of the K image blocks, $\sigma_{B_{K,i},i}^2$ is a variance of the K centroid values corresponding to the K image blocks, the K image blocks are the $i^{th}$ image blocks in all of the previous K frames of images, locations of the K image blocks are corresponding to locations of the $i^{th}$ image blocks in all of the $(K+1)^{th}$ frame of image to the $(K+L)^{th}$ frame of image, the locations of the K image blocks are corresponding to a location of the $i^{th}$ image block in the first background frame, and i is a positive integer.

With reference to the second possible implementation of the first aspect to the seventh possible implementation of the first aspect of the embodiments of the present disclosure, in a ninth possible implementation of the first aspect of the embodiments of the present disclosure, the calculating, according to the first statistical characteristic, a first probability that an image block in each of the $(K+1)^{th}$ frame of image of the video sequence to the $(K+L)^{th}$ frame of image of the video sequence uses the first background frame as a reference includes:

calculating the first probability by using the following formula:

$$P_i = \int_{\frac{e_i}{\sigma_i}}^{\frac{e_i}{\sigma_i}} \frac{1}{\sqrt{2\pi}} \exp\left(-\frac{x^2}{2}\right) dx,$$

where $P_i$ is a probability that the $i^{th}$ image block in each of the $(K+1)^{th}$ frame of image of the video sequence to the $(K+L)^{th}$ frame of image of the video sequence uses the $i^{th}$ image block in the first background frame as a reference, $e_i = \sqrt{e_{K,i}^2}$, and $\sigma_i = \sqrt{\sigma_{K,i}^2}$, where $e_{K,i}^2$ is an average coding distortion of the K image blocks, $\sigma_{K,i}^2$ is a variance of the K centroid values corresponding to the K image blocks, the K image blocks are the $i^{th}$ image blocks in all of the previous K frames of images, locations of the K image blocks are corresponding to locations of the $i^{th}$ image blocks in all of the $(K+1)^{th}$ frame of image to the $(K+L)^{th}$ frame of image, the locations of the K image blocks are corresponding to a location of the $i^{th}$ image block in the first background frame, and i is a positive integer.

With reference to the first possible implementation of the first aspect to the ninth possible implementation of the first aspect of the embodiments of the present disclosure, in a tenth possible implementation of the first aspect of the embodiments of the present disclosure, the calculating, according to the first probability, the QP used for encoding the first background frame includes:

calculating, by using the following formula, the QP used for encoding the first background frame:

$$QP_i = \begin{cases} \max(QP_{mode} - 3\log_2(KP_i), QP_{min}), & P_i > P_T \\ QP_{mode}, & P_i \le P_T \end{cases},$$

where $QP_i$ is a QP used for encoding the $i^{th}$ image block in the first background frame, $P_i$ is the probability that the $i^{th}$ image block in each of the $(K+1)^{th}$ frame of image of the video sequence to the $(K+L)^{th}$ frame of image of the video sequence uses the $i^{th}$ image block in the first background frame as a reference, $P_T$ is a preset value, $QP_{min}$ is a minimum QP value allowed by current encoding, $QP_{mode}$ is a minimum value in QPs used by image frames that are in the previous K frames of images of the video sequence and that use a same encoding mode as the first background frame, and a location of the $i^{th}$ image block in each of the $(K+1)^{th}$ frame of image to the $(K+L)^{th}$ frame of image is corresponding to the location of the $i^{th}$ image block in the first background frame.

With reference to the third possible implementation of the first aspect to the ninth possible implementation of the first aspect of the embodiments of the present disclosure, in an eleventh possible implementation of the first aspect of the embodiments of the present disclosure, the calculating, according to the first probability, the QP used for encoding the first background frame includes:

calculating, by using the following formula, the QP used for encoding the first background frame:

$$QP_i = \begin{cases} \max(QP_{mode} - 3\log_2(B_{K,i}P_i), QP_{min}), & P_i > P_T \\ QP_{mode}, & P_i \le P_T \end{cases},$$

where $QP_i$ is a QP used for encoding the $i^{th}$ image block in the first background frame, $P_i$ is the probability that the $i^{th}$ image block in each of the $(K+1)^{th}$ frame of image of the video sequence to the $(K+L)^{th}$ frame of image of the video sequence uses the $i^{th}$ image block in the first background frame as a reference, $P_T$ is a preset value, $QP_{min}$ is a minimum QP value allowed by current encoding, $QP_{mode}$ is a minimum value in QPs used by image frames that are in the previous K frames of images of the video sequence and that use a same encoding mode as the first background frame, and a location of the $i^{th}$ image block in each of the $(K+1)^{th}$ frame of image to the $(K+L)^{th}$ frame of image is corresponding to the location of the $i^{th}$ image block in the first background frame.

With reference to the third possible implementation of the first aspect to the eleventh possible implementation of the first aspect of the embodiments of the present disclosure, in a twelfth possible implementation of the first aspect of the embodiments of the present disclosure, the determining a first background frame includes:
performing iteration on the previous K frames of images by using the following formula, to obtain a target iteration pixel value that is calculated according to a pixel value of the $K^{th}$ frame of image, and using the target iteration pixel value as a pixel value of the first background frame:

$$P_{j,x,y} = \begin{cases} o_{j,x,y}, & j = 1 \\ o_{j,x,y}, & B_{j,i} = 1, j \ge 2 \\ \dfrac{1}{B_{j,i}}((B_{j,i}-1)P'_{j,x,y} + o_{j,x,y}), & B_{j,i} > 1, j \ge 2 \end{cases},$$

where $P_{j,x,y}$ is an iteration pixel value that is calculated according to a pixel value at a location (x,y) in the $j^{th}$ frame of the video sequence, $P_{j,x,y}'$ is an iteration pixel value that is calculated according to a pixel value at a location (x,y) in the $(j-1)^{th}$ frame of the video sequence, and $o_{j,x,y}$ represents the pixel value at the location (x,y) in the $j^{th}$ frame of image of the video sequence.

With reference to the first possible implementation of the first aspect to the twelfth possible implementation of the first aspect of the embodiments of the present disclosure, in a thirteenth possible implementation of the first aspect of the embodiments of the present disclosure, after the obtaining a first statistical characteristic of previous K frames of images of the video sequence, the method further includes:

obtaining a second statistical characteristic of the $(K+1)^{th}$ frame of image of the video sequence to the $(K+L)^{th}$ frame of image of the video sequence;

determining a second background frame, where the second background frame is used as a reference when encoding is performed on the $(K+L+1)^{th}$ frame of image of the video sequence to the $(K+N)^{th}$ frame of image of the video sequence, where N>L+1, and N is a positive integer;

counting a quantity of times that the $i^{th}$ image block in the first background frame is used as a reference block, where the locations of the K image blocks are corresponding to the location of the $i^{th}$ image block in the first background frame;

calculating a probability prediction error according to the first probability and the quantity of times that the $i^{th}$ image block in the first background frame is used as a reference block;

calculating, according to the second statistical characteristic, a second probability that the $(K+L+1)^{th}$ frame of image to the $(K+N)^{th}$ frame of image of the video sequence use the second background frame as a reference;

calculating, according to the second probability and the probability prediction error, a third probability that each of the $(K+L+1)^{th}$ frame of image of the video sequence to the $(K+N)^{th}$ frame of image of the video sequence uses the second background frame as a reference;

calculating, according to the third probability, a QP used for encoding the second background frame;

encoding the second background frame according to the QP used for encoding the second background frame, to obtain a second background long-term reference frame; and encoding the $(K+L+1)^{th}$ frame of image of the video sequence to the $(K+N)^{th}$ frame of image of the video sequence according to the second background long-term reference frame.

A second aspect of the embodiments of the present disclosure provides a video decoding method, including:

decoding previous K frames of images of a video sequence, where K is a positive integer;

decoding a first background frame, where the first background frame is used as a reference when decoding is performed on the $(K+1)^{th}$ frame of image of the video sequence to the $(K+L)^{th}$ frame of image of the video sequence, where L is a positive integer; and using the first background frame as a first long-term reference frame, and decoding the $(K+1)^{th}$ frame of image to the $(K+L)^{th}$ frame of image of the video sequence, where L is a positive integer.

With reference to the second aspect of the embodiments of the present disclosure, in a first possible implementation of the second aspect of the embodiments of the present disclosure, after the using the first background frame as a first long-term reference frame, and decoding the $(K+1)^{th}$ frame of image to the $(K+L)^{th}$ frame of image of the video sequence, the method further includes:

decoding a second background frame, where the second background frame is used as a reference when decoding is performed on the $(K+L+1)^{th}$ frame of image to the $(K+N)^{th}$ frame of image of the video sequence, where N>L+1, and N is a positive integer; and using the second background frame as a second long-term reference frame, and decoding the $(K+L+1)^{th}$ frame of image to the $(K+N)^{th}$ frame of image of the video sequence.

A third aspect of the embodiments of the present disclosure provides a video encoding apparatus, including:

an obtaining unit, configured to obtain a first statistical characteristic of previous K frames of images of a video sequence, where K is a positive integer;

a first determining unit, configured to determine a first background frame, where the first background frame is used as a reference when encoding is performed on the $(K+1)^{th}$ frame of image of the video sequence to the $(K+L)^{th}$ frame of image of the video sequence, where L is a positive integer;

a second determining unit, configured to determine, according to the first statistical characteristic obtained by the obtaining unit, a quantization parameter (QP) used for encoding the first background frame determined by the first determining unit;

a first encoding unit, configured to encode the first background frame according to the QP determined by the second determining unit, to obtain a first background long-term reference frame; and a second encoding unit, configured to encode the $(K+1)^{th}$ frame of image of the video sequence to the $(K+L)^{th}$ frame of image of the video sequence according to the first background long-term reference frame obtained by the first encoding unit.

With reference to the third aspect of the embodiments of the present disclosure, in a first possible implementation of the third aspect of the embodiments of the present disclosure, the second determining unit is configured to:

calculate, according to the first statistical characteristic, a first probability that an image block in each of the $(K+1)^{th}$ frame of image of the video sequence to the $(K+L)^{th}$ frame of image of the video sequence uses the first background frame as a reference; and calculate, according to the first probability, the QP used for encoding the first background frame.

With reference to the third aspect of the embodiments of the present disclosure or the first possible implementation of the third aspect, in a second possible implementation of the third aspect of the embodiments of the present disclosure, the first statistical characteristic includes a variance of K centroid values corresponding to K image blocks and an average coding distortion of K coding distortions corresponding to the K image blocks, where the K image blocks are image blocks located at same locations in all of the previous K frames of images, the variance of the K centroid values is a variance of a centroid value sequence constituted by the K centroid values, and the average coding distortion of the K coding distortions is an average value of a coding distortion sequence constituted by the K coding distortions.

With reference to the second possible implementation of the third aspect of the embodiments of the present disclosure, in a third possible implementation of the third aspect of the embodiments of the present disclosure, the K image blocks are the $i^{th}$ image blocks in all of the previous K frames of images, where i is a positive integer; and the obtaining unit is configured to:

perform iteration calculation according to an order from the second frame of image of the previous K frames of images to the $K^{th}$ frame of image of the previous K frames of images, to obtain the variance of the K centroid values corresponding to the $i^{th}$ image blocks in all of the previous K frames of images, and the average coding distortion of the K coding distortions corresponding to the $i^{th}$ image blocks in all of the previous K frames of images, where the iteration calculation includes:

determining whether the $i^{th}$ image block in the $j^{th}$ frame of image of the video sequence belongs to a background region; and when the $i^{th}$ image block in the $j^{th}$ frame of the video sequence belongs to the background region, obtaining, according to $B_{j,i}=B_{j-1,i}+1$, a quantity $B_{j,i}$ of image blocks that are of previous j image blocks and that belong to the background region, where the previous j image blocks are the $i^{th}$ image blocks in all of previous j frames of images of the video sequence; and calculating, according to $B_{j,i}$, a variance of j centroid values corresponding to the $i^{th}$ image blocks in all of the previous j frames of images and an average coding distortion of j coding distortions corresponding to the $i^{th}$ image blocks in all of the previous j frames of images, where K≥j≥2, and when the $i^{th}$ image block in the first frame of image of the video sequence belongs to the background region, $B_{1,i}$ is 1, or when the $i^{th}$ image block in the first frame of image of the video sequence does not belong to the background region, $B_{1,i}$ is 0; or when the $i^{th}$ image block in the $j^{th}$ frame of image of the video sequence does not belong to the background region, obtaining, according to $B_{j,i}=B_{j-1,i}$, a quantity $B_{j,i}$ of image blocks that are of previous j image blocks and that belong to the background region, where the previous j image blocks are the $i^{th}$ image blocks in all of previous j frames of images, using a variance of j−1 centroid values corresponding to the $i^{th}$ image blocks in all of previous j−1 frames of images of the video sequence as a variance of j centroid values corresponding to the $i^{th}$ image blocks in all of the previous j frames of images, and using an average coding distortion of j−1 coding distortions corresponding to the $i^{th}$ image blocks in all of the previous j−1 frames of images of the video sequence as an average coding distortion of j coding distortions corresponding to the $i^{th}$ image blocks in all of the previous j frames of images of the video sequence, where when j is 2, the variance of the j−1 centroid values corresponding to the $i^{th}$ image blocks in all of the previous j−1 frames of images is a first preset value, and the average coding distortion of the j−1 coding distortions corresponding to the $i^{th}$ image blocks in all of the previous j−1 frames of images is a second preset value or a coding distortion of the first frame of image of the video sequence.

With reference to the third possible implementation of the third aspect of the embodiments of the present disclosure, in a fourth possible implementation of the third aspect of the embodiments of the present disclosure, the obtaining unit is configured to: determine whether a horizontal component of a minimum motion vector in motion vectors of an image subblock of the $i^{th}$ image block in the $j^{th}$ frame of image is less than a first preset threshold, and whether a vertical component of the minimum motion vector is less than a second preset threshold; and when the horizontal component is less than the first preset threshold, and the vertical component is less than the second preset threshold, determine that the $i^{th}$ image block in the $j^{th}$ frame of image belongs to the background region; or when the horizontal component is not less than the first preset threshold or the vertical component is not less than the second preset threshold, determine that the $i^{th}$ image block in the $j^{th}$ frame of image does not belong to the background region.

With reference to the third possible implementation of the third aspect or the fourth possible implementation of the third aspect of the embodiments of the present disclosure, in a fifth possible implementation of the third aspect of the embodiments of the present disclosure, the obtaining unit is configured to: obtain a centroid value of the $i^{th}$ image block in the $j^{th}$ frame of image and a coding distortion of the $i^{th}$ image block in the $j^{th}$ frame of image; calculate, according to the centroid value of the $i^{th}$ image block in the $j^{th}$ frame of image and $B_{j,i}$, the variance of the j centroid values corresponding to the $i^{th}$ image blocks in all of the previous j frames of images; and calculate, according to the coding distortion of the $i^{th}$ image block in the $j^{th}$ frame of image and $B_{j,i}$, the average coding distortion of the j coding distortions corresponding to the $i^{th}$ image blocks in all of the previous j frames of images.

With reference to the fifth possible implementation of the third aspect of the embodiments of the present disclosure, in a sixth possible implementation of the third aspect of the embodiments of the present disclosure, the obtaining unit is configured to calculate, by using the following formula, the variance of the j centroid values corresponding to the $i^{th}$ image blocks in all of the previous j frames of images:

$$\mu_{j,i} = \begin{cases} \omega_{j,i}, & B_{j,i} = 1 \\ \dfrac{1}{B_{j,i}}((B_{j,i}-1)\mu_{j-1,i} + \omega_{j,i}), & B_{j,i} > 1 \end{cases} ; \text{ and}$$

$$\sigma_{j,i}^2 = \begin{cases} 0, & B_{j,i} = 1 \\ \dfrac{(B_{j,i}-1)\sigma_{j-1,i}^2 + (\omega_{j,i} - \mu_{j-1,i})^2}{B_{j,i}} - (\mu_{j-1,i} - \mu_{j,i})^2, & B_{j,i} > 1 \end{cases},$$

where $\mu_{j,i}$ is an average value of centroid values of the previous j image blocks, $\mu_{j-1,i}$ is an average value of centroid values of the previous j−1 image blocks, $\omega_{j,i}$ is a centroid value of the $i^{th}$ image block in the $j^{th}$ frame of image, $\sigma_{j,i}^2$ is a variance of the centroid values of the previous j image blocks, $\sigma_{j-1,i}^2$ is a variance of the centroid values of the previous j−1 image blocks, and the previous j−1 image blocks are the $i^{th}$ image blocks in all of the previous j−1 frames of images.

With reference to the fifth possible implementation of the third aspect or the sixth possible implementation of the third aspect of the embodiments of the present disclosure, in a seventh possible implementation of the third aspect of the embodiments of the present disclosure, the obtaining unit is configured to calculate, by using the following formula, the average coding distortion of the j coding distortions corresponding to the $i^{th}$ image blocks in all of the previous j frames of images:

$$e_{j,i}^2 = \begin{cases} d_{j,i}^2, & B_{j,i} = 1 \\ \dfrac{1}{B_{j,i}}((B_{j,i}-1)e_{j-1,i}^2 + d_{j,i}^2), & B_{j,i} > 1 \end{cases},$$

where $d_{j,i}^2$ is a coding distortion of the $i^{th}$ image block in the $j^{th}$ frame of image, $e_{j,i}^2$ is an average coding distortion of the previous j image blocks, and $e_{j-1,i}^2$ is an average coding distortion of the previous j−1 image blocks.

With reference to the third possible implementation of the third aspect to the seventh possible implementation of the third aspect of the embodiments of the present disclosure, in an eighth possible implementation of the third aspect of the embodiments of the present disclosure, the second determining unit is configured to calculate the first probability by using the following formula:

$$P_i = \int_{\frac{e_i}{\sigma_i}}^{\frac{e_i}{\sigma_i}} \frac{1}{\sqrt{2\pi}} \exp\left(-\frac{x^2}{2}\right) dx,$$

where $P_i$ is a probability that the $i^{th}$ image block in each of the $(K+1)^{th}$ frame of image of the video sequence to the $(K+L)^{th}$ frame of image of the video sequence uses the $i^{th}$ image block in the first background frame as a reference, $$e_i \sqrt{e_{B_{K,i}}^2},$$

and $$\sigma_i \sqrt{\sigma_{B_{K,i}}^2},$$

where $e_{B_{K,i}}^2$ is an average coding distortion of the K image blocks, $\sigma_{B_{K,i}}^2$ is a variance of the K centroid values corresponding to the K image blocks, the K image blocks are the $i^{th}$ image blocks in all of the previous K frames of images, locations of the K image blocks are corresponding to locations of the $i^{th}$ image blocks in all of the $(K+1)^{th}$ frame of image to the $(K+L)^{th}$ frame of image, the locations of the K image blocks are corresponding to a location of the $i^{th}$ image block in the first background frame, and i is a positive integer.

With reference to the second possible implementation of the third aspect to the seventh possible implementation of the third aspect of the embodiments of the present disclosure, in a ninth possible implementation of the third aspect of the embodiments of the present disclosure, the second determining unit is configured to calculate the first probability by using the following formula:

$$P_i = \int_{\frac{e_i}{\sigma_i}}^{\frac{e_i}{\sigma_i}} \frac{1}{\sqrt{2\pi}} \exp\left(-\frac{x^2}{2}\right) dx,$$

where $P_i$ is a probability that the $i^{th}$ image block in each of the $(K+1)^{th}$ frame of image of the video sequence to the $(K+L)^{th}$ frame of image of the video sequence uses the $i^{th}$ image block in the first background frame as a reference, $e_i = \sqrt{e_{K,i}^2}$, and $\sigma_i = \sqrt{\sigma_{K,i}^2}$, where $e_{K,i}^2$ is an average coding distortion of the K image blocks, $\sigma_{K,i}^2$ is a variance of the K centroid values corresponding to the K image blocks, the K image blocks are the $i^{th}$ image blocks in all of the previous K frames of images, locations of the K image blocks are corresponding to locations of the $i^{th}$ image blocks in all of the $(K+1)^{th}$ frame of image to the $(K+L)^{th}$ frame of image, the locations of the K image blocks are corresponding to a location of the $i^{th}$ image block in the first background frame, and i is a positive integer.

With reference to the first possible implementation of the third aspect to the ninth possible implementation of the third aspect of the embodiments of the present disclosure, in a tenth possible implementation of the third aspect of the embodiments of the present disclosure, the second determining unit is configured to calculate, by using the following formula, the QP used for encoding the first background frame:

$$QP_i = \begin{cases} \max(QP_{mode} - 3\log_2(KP_i), QP_{min}), & P_i > P_T \\ QP_{mode}, & P_i \leq P_T \end{cases},$$

where $QP_i$ is a QP used for encoding the $i^{th}$ image block in the first background frame, $P_i$ is the probability that the $i^{th}$ image block in each of the $(K+1)^{th}$ frame of image of the video sequence to the $(K+L)^{th}$ frame of image of the video sequence uses the $i^{th}$ image block in the first background frame as a reference, $P_T$ is a preset value, $QP_{min}$ is a minimum QP value allowed by current encoding, $QP_{mode}$ is a minimum value in QPs used by image frames that are in the previous K frames of images of the video sequence and that use a same encoding mode as the first background frame, and a location of the $i^{th}$ image block in each of the $(K+1)^{th}$ frame of image to the $(K+L)^{th}$ frame of image is corresponding to the location of the $i^{th}$ image block in the first background frame.

With reference to the third possible implementation of the third aspect to the ninth possible implementation of the third aspect of the embodiments of the present disclosure, in an eleventh possible implementation of the third aspect of the embodiments of the present disclosure, the second determining unit is configured to calculate, by using the following formula, the QP used for encoding the first background frame:

$$QP_i = \begin{cases} \max(QP_{mode} - 3\log_2(B_{K,i}P_i), QP_{min}), & P_i > P_T \\ QP_{mode}, & P_i \le P_T \end{cases},$$

where $QP_i$ is a QP used for encoding the $i^{th}$ image block in the first background frame, $P_i$ is the probability that the $i^{th}$ image block in each of the $(K+1)^{th}$ frame of image of the video sequence to the $(K+L)^{th}$ frame of image of the video sequence uses the $i^{th}$ image block in the first background frame as a reference, $P_T$ is a preset value, $QP_{min}$ is a minimum QP value allowed by current encoding, $QP_{mode}$ is a minimum value in QPs used by image frames that are in the previous K frames of images of the video sequence and that use a same encoding mode as the first background frame, and a location of the $i^{th}$ image block in each of the $(K+1)^{th}$ frame of image to the $(K+L)^{th}$ frame of image is corresponding to the location of the $i^{th}$ image block in the first background frame.

With reference to the third possible implementation of the third aspect to the eleventh possible implementation of the third aspect of the embodiments of the present disclosure, in a twelfth possible implementation of the third aspect of the embodiments of the present disclosure, the first determining unit is configured to: perform iteration on the previous K frames of images by using the following formula, to obtain a target iteration pixel value that is calculated according to a pixel value of the $K^{th}$ frame of image, and use the target iteration pixel value as a pixel value of the first background frame:

$$P_{j,x,y} = \begin{cases} o_{j,x,y}, & j = 1 \\ o_{j,x,y}, & B_{j,i} = 1, j \ge 2 \\ \dfrac{1}{B_{j,i}}((B_{j,i}-1)P'_{j,x,y} + o_{j,x,y}), & B_{j,i} > 1, j \ge 2 \end{cases},$$

where $P_{j,x,y}$ is an iteration pixel value that is calculated according to a pixel value at a location (x,y) in the $j^{th}$ frame of the video sequence, $P_{j,x,y}'$ is an iteration pixel value that is calculated according to a pixel value at a location (x,y) in the $(j-1)^{th}$ frame of the video sequence, and $o_{j,x,y}$ represents the pixel value at the location (x,y) in the $j^{th}$ frame of image of the video sequence.

With reference to the first possible implementation of the third aspect to the twelfth possible implementation of the third aspect of the embodiments of the present disclosure, in a thirteenth possible implementation of the third aspect of the embodiments of the present disclosure, the obtaining unit is further configured to obtain a second statistical characteristic of the $(K+1)^{th}$ frame of image of the video sequence to the $(K+L)^{th}$ frame of image of the video sequence;

the first determining unit is further configured to determine a second background frame, where the second background frame is used as a reference when encoding is performed on the $(K+L+1)^{th}$ frame of image of the video sequence to the $(K+N)^{th}$ frame of image of the video sequence, where N>L+1, and N is a positive integer;

the second determining unit is further configured to: count a quantity of times that the $i^{th}$ image block in the first background frame is used as a reference block, where the locations of the K image blocks are corresponding to the location of the $i^{th}$ image block in the first background frame; calculate a probability prediction error according to the first probability and the quantity of times that the $i^{th}$ image block in the first background frame is used as a reference block; calculate, according to the second statistical characteristic obtained by the obtaining unit, a second probability that the $(K+L+1)^{th}$ frame of image to the $(K+N)^{th}$ frame of image of the video sequence use the second background frame as a reference, where the second background frame is determined by the first determining unit; calculate, according to the second probability and the probability prediction error, a third probability that each of the $(K+L+1)^{th}$ frame of image of the video sequence to the $(K+N)^{th}$ frame of image of the video sequence uses the second background frame as a reference; and calculate, according to the third probability, a QP used for encoding the second background frame;

the first encoding unit is further configured to encode the second background frame according to the QP used for encoding the second background frame, to obtain a second background long-term reference frame, where the QP is determined by the second determining unit; and the second encoding unit is further configured to encode the $(K+L+1)^{th}$ frame of image of the video sequence to the $(K+N)^{th}$ frame of image of the video sequence according to the second background long-term reference frame obtained by the first encoding unit.

A fourth aspect of the embodiments of the present disclosure provides a video decoding apparatus, including:

an image decoding unit, configured to decode previous K frames of images of a video sequence, where K is a positive integer; and a background frame decoding unit, configured to decode a first background frame, where the first background frame is used as a reference when decoding is performed on the $(K+1)^{th}$ frame of image of the video sequence to the $(K+L)^{th}$ frame of image of the video sequence, where L is a positive integer, where the image decoding unit is further configured to: use the first background frame, obtained by the background frame decoding unit, as a first long-term reference frame, and decode the $(K+1)^{th}$ frame of image to the $(K+L)^{th}$ frame of image of the video sequence, where L is a positive integer.

With reference to the fourth aspect of the embodiments of the present disclosure, in a first possible implementation of the fourth aspect of the embodiments of the present disclosure, the background frame decoding unit is further configured to decode a second background frame, where the second background frame is used as a reference when decoding is performed on the $(K+L+1)^{th}$ frame of image to the $(K+N)^{th}$ frame of image of the video sequence, where N>L+1, and N is a positive integer; and the image decoding unit is further configured to: use the second background frame, obtained by the background frame decoding unit, as a second long-term reference frame, and decode the $(K+L+1)^{th}$ frame of image to the $(K+N)^{th}$ frame of image of the video sequence.

It can be learned from the foregoing technical solutions that the embodiments of the present disclosure have the following advantages:

According to the embodiments of the present disclosure, the first statistical characteristic of the previous K frames of images of the video sequence is obtained; the QP used for encoding the first background frame is determined according to the first statistical characteristic; the determined first background frame is encoded according to the QP used for encoding the first background frame, to obtain the first background long-term reference frame; and encoding is performed on the $(K+1)^{th}$ frame of image of the video sequence to the $(K+L)^{th}$ frame of image of the video sequence according to the first background long-term reference frame. In the embodiments of the present disclosure, when encoding is performed on the $(K+1)^{th}$ frame of image of the video sequence to the $(K+L)^{th}$ frame of image of the video sequence, the used quantization parameter for encoding the background long-term reference frame is determined according to the first statistical characteristic related to video content of the previous K frames of images. This improves overall video encoding quality.

DESCRIPTION OF EMBODIMENTS

Figure 1:
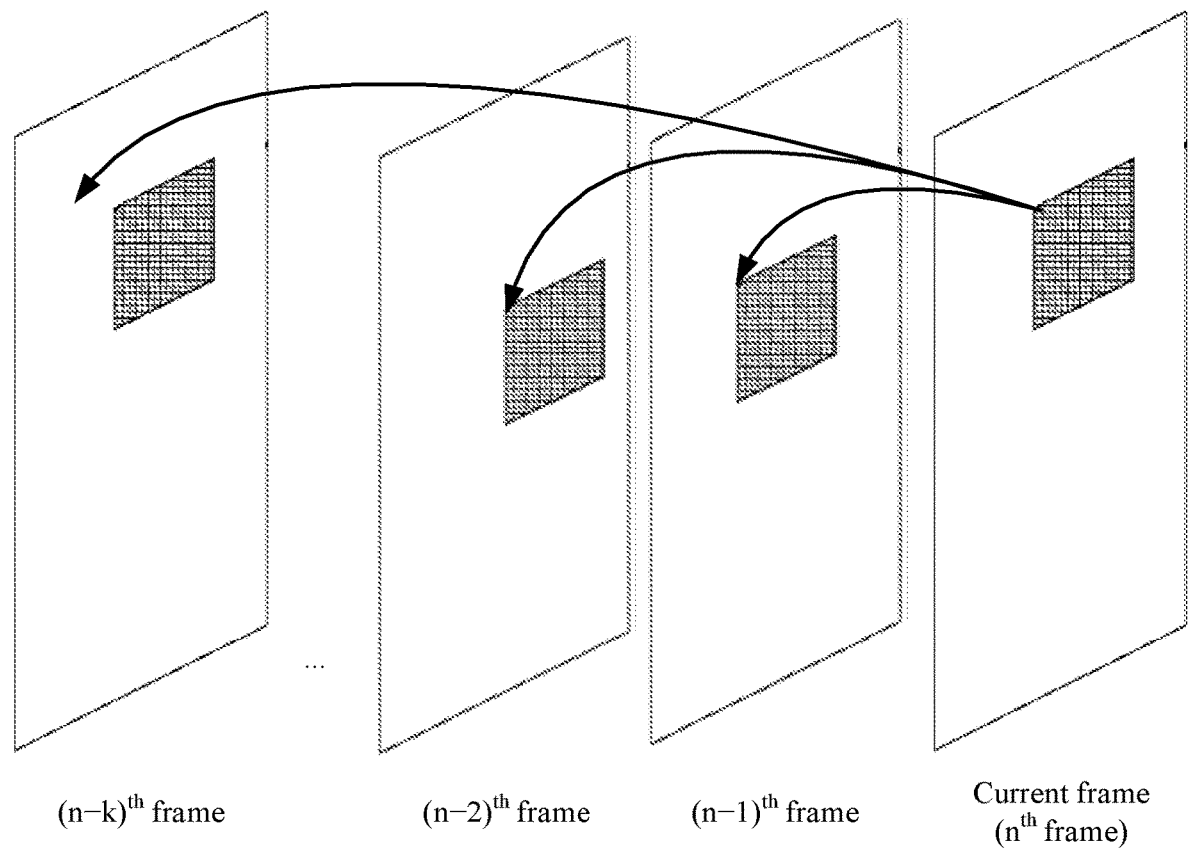
FIG. 1 is a schematic diagram of an embodiment of a video encoding method according to embodiments of the present disclosure.

The embodiments of the present disclosure provide a video encoding and decoding method and apparatus, to improve overall video encoding quality.

To make persons skilled in the art understand the technical solutions in the present disclosure better, the following clearly describes the technical solutions in the embodiments of the present disclosure with reference to the accompanying drawings in the embodiments of the present disclosure.

In the specification, claims, and accompanying drawings of the present disclosure, the terms "first", "second", and the like (if they exist) are intended to distinguish between similar objects but do not necessarily indicate a specific order or sequence. It should be understood that the data termed in such a way are interchangeable in proper circumstances, so that the embodiments described herein can be implemented in an order other than the order illustrated or described herein. Moreover, the terms "include", "contain", and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

The following first briefly describes some concepts that are possibly used in the embodiments of the present disclosure.

At present, there are two international organizations specialized in formulating video encoding standards: the Moving Picture Experts Group (MPEG for short) of the International Organization for Standardization (ISO for short) and the International Electrotechnical Commission (IEC for short), and the Video Coding Experts Group (VCEG for short) of the International Telecommunication Union-Telecommunication standardization sector (ITU-T for short). The MPEG established in 1986, is specialized in formulating related standards in the multimedia field, which are mainly applied to storage, television broadcasting, streaming media over the Internet or a wireless network, or the like. The ITU-T mainly formulates video encoding standards in the field of real-time video communications, for example, applications such as a video call and a video conference. In the past decades, video encoding standards specific to various applications have been made internationally, mainly including: the MPEG-1 standard for VCD, the MPEG-2 standard for DVD and DVB, the H.261 standard and the H.263 standard for video conference, the MPEG-4 standard used for encoding objects of any shape, the newest internationally made H.264/AVC standard, and the HEVC standard.

In the HEVC standard, a video sequence includes a series of picture frames. The picture frame is further divided into slices, and the slice is further divided into blocks. Video encoding is performed in unit of a block, and encoding processing may be performed row by row, starting from the left corner of a picture, from left to right and top to bottom.

In the HEVC standard, there are two types of reference frames: a short-term reference frame and a long-term reference frame. The short-term reference frame is generally a reconstructed frame relatively close to a current reference frame, and has a short-term characteristic of a current frame, for example, has a motion foreground of a shape similar to that of the current frame. The long-term reference frame may be a reconstructed frame relatively far away from the current frame, or may be a reference frame obtained by means of synthesis, and has a long-term characteristic of a video sequence segment, for example, has a background frame of the video sequence segment.

YUV: YUV is a color encoding method (belonging to PAL) used by an European television system, and is a color space used in PAL and SECAM analogue color television standards. In a modern color television system, a three-tube color camera or a color CCD camera is usually used to capture an image. Then, color separation, and respective amplification and correction are performed on an obtained color image signal to obtain an RGB image signal. Then the image signal is processed by a matrix transformation circuit to obtain a luminance signal Y and two color difference signals B−Y (that is, U) and R−Y (that is, V). Finally, a transmit end separately encodes the luminance signal and the two color difference signals, and sends the three signals on a same channel. Such a color representation method is a so-called YUV color space representation. An importance of the YUV color space is that the luminance signal Y is separated from the chrominance signals U and V in the color space representation.

A principle of YUV is that luminance is separated from chrominance. Research has proved that human eyes are more sensitive to luminance than chrominance. Based on this principle, if chrominance information is reduced, human cannot perceive such a change by eyes. "Y" represents luminance (or Luma), that is, a gray scale value. "U" and "V" represent chrominance (or Chroma), and are used to describe a video color and saturation and specify a color of a pixel.

An I frame is also referred to as an intra picture. The I frame is usually the first frame of each GOP. After being compressed appropriately, the I frame is used as a reference point for random access, and can be used as an image. In an encoding process, some video frame sequences are compressed into the I frame, some video frame sequences are compressed into a P frame, and some video frame sequences are compressed into a B frame. An I frame method is an intra-frame compression method, and is also referred to as a "key frame" compression method. The I frame method is a compression technology based on discrete cosine transform (DCT), and this algorithm is similar to a JPEG compression algorithm. A compression ratio of 1/6 can be achieved by using I frame compression, without apparent compression traces.

Characteristics of the I frame: The I frame is an intra frame, and uses an intra-frame prediction method for compression coding. When decoding is performed, a complete image can be reconstructed by using only data in the I frame. The I frame can be generated without using another picture as a reference. The I frame is a reference frame for a P frame and a B frame (quality of the I frame directly affects quality of each frame following the I frame in a same group). The I frame is a basic frame (the first frame) of a frame group GOP, and there is only one I frame in the group. A motion vector does not need to be considered for the I frame. The I frame has a relatively large amount of data information.

A P frame is a forward-predicted frame.

Prediction and reconstruction of the P frame: The P frame uses the I frame as a reference frame. A prediction value and a motion vector of "a point" of the P frame are found in the I frame; a prediction difference is calculated; and the prediction difference and the motion vector are transmitted together. A receive end finds, in the I frame, the prediction value of "the point" of the P frame according to the motion vector, and adds up the prediction value and the difference to obtain a reconstruction value of "the point" of the P frame, so as to obtain the complete P frame.

Characteristics of the P frame: The P frame is an encoding frame following the I frame. The P frame uses a motion compensation method to transmit a difference between the P frame and a frame previous to the P frame and a motion vector (a prediction error). When decoding is performed, a complete P frame image can be reconstructed only by calculating a sum of the prediction value of the frame and the prediction error. Encoding of the P frame belongs to forward predictive inter-frame coding, and uses only a frame previous to the P frame as a reference. The P frame may be a reference frame of a P frame following this P frame, or may be a reference frame of a B frame previous to or following the P frame. As the P frame is a reference frame, diffusion of a decoding error may be caused. A compression ratio of the P frame is relatively high as the P frame transmits a difference.

A B frame is a bi-directional interpolated prediction frame.

Prediction and reconstruction of the B frame: The B frame uses a frame previous to the B frame and a frame following the B frame as reference frames. A prediction value and two motion vectors of "a point" of the B frame are "found"; a prediction difference is calculated; and the prediction difference and the motion vectors are transmitted. A receive end "finds (calculates)" the prediction value between the two reference frames according to the motion vectors, and adds up the prediction value and the difference to obtain a reconstruction value of "the point" of the B frame, so that a complete B frame can be obtained.

Characteristics of the B frame: The B frame is predicted according to a frame previous to the B frame and a frame following the B frame. The B frame transmits a prediction error between the B frame and the frame previous to the B frame, a prediction error between the B frame and the frame following the B frame, and motion vectors. The B frame is a bi-directional predicted frame. The B frame has a highest compression ratio because the B frame reflects only a change status of a motion subject between the two reference frames, and prediction is relatively accurate.

The following describes some background technologies related to the present disclosure.

A video is strongly time-correlated, that is, two adjacent frames of images have many similar image blocks. Therefore, in inter prediction of video encoding, for a current block, motion search is usually performed on a reconstructed frame, to find a block that matches the current block best as a reference block. However, due to factors such as blocking, a light change, noise, and a camera movement, a relatively good reference block may not be found in a nearest frame of image for the current block. Therefore, a multi-reference frame coding technology is introduced. As shown in FIG. 1, motion search is performed in previous k reference frames separately to find an image block with optimum encoding performance for an image block in the current frame.

In the multi-reference frame coding technology, during a search for a block that matches an image block best, motion search is performed first from a previous reference frame, to find an optimum motion vector with a smallest rate distortion cost within a specific search range, and then motion search is performed on a next reference frame. A motion vector and a used reference frame can be finally determined only after motion search is performed on all reference frames.

In a video compression process, if a compression bit rate is excessively large, an image distortion is prone to occur. However, if the compression bit rate is excessively small, data bandwidth cannot be reduced to a threshold range allowed by a network or a computer. To address this issue, a Rate Distortion Optimization (RDO) technology emerges. A key of the RDO technology is to find, by calculating an encoding cost for encoding an image block in different encoding modes, an appropriate balance between improving the compression bit rate and avoiding distortion, that is, ensuring both the compression bit rate and video quality.

The rate distortion optimization technology is restricted by a given bit rate condition, and expects to minimize a coding distortion by selecting an appropriate coding parameter according to the rate distortion optimization technology. In all existing mainstream encoding frameworks, a Lagrange multiplier is used to transform a constrained problem into an unconstrained problem, that is, J in a minimization formula (2) is used to select an optimum mode.

$$J = D + \lambda R \qquad (2)$$

J is usually referred to as a rate distortion cost RD cost, and λ is referred to as a Lagrange multiplier, and is usually adjusted by adjusting a quantization parameter (Quantization Parameter, QP). λ and QP have the following relationship:

$$\lambda = QP_{factor} \cdot 2^{(QP-12)/3} \quad (3)$$

$QP_{factor}$ is a constant related to an encoding mode, and is an important counter of determining video bitstream quality. As the QP is described in detail in both the H.264 protocol and the H.265/HEVC protocol, details are not repeated herein.

It can be learned that a value of the QP directly determines whether a reconstructed frame is a low-bit-rate and high-distortion reconstructed frame or a high-bit-rate and low-distortion reconstructed frame. That is, the QP directly affects encoding effect.

The following describes the technical solutions of the embodiments of the present disclosure.

A video encoding method provided in an embodiment of the present disclosure is described first. The video encoding method provided in this embodiment of the present disclosure is executed by a video encoding apparatus. The video encoding apparatus may be any apparatus that needs to output and store a video, such as a mobile phone, a notebook computer, a tablet computer, a personal computer, or another device.

Figure 2:
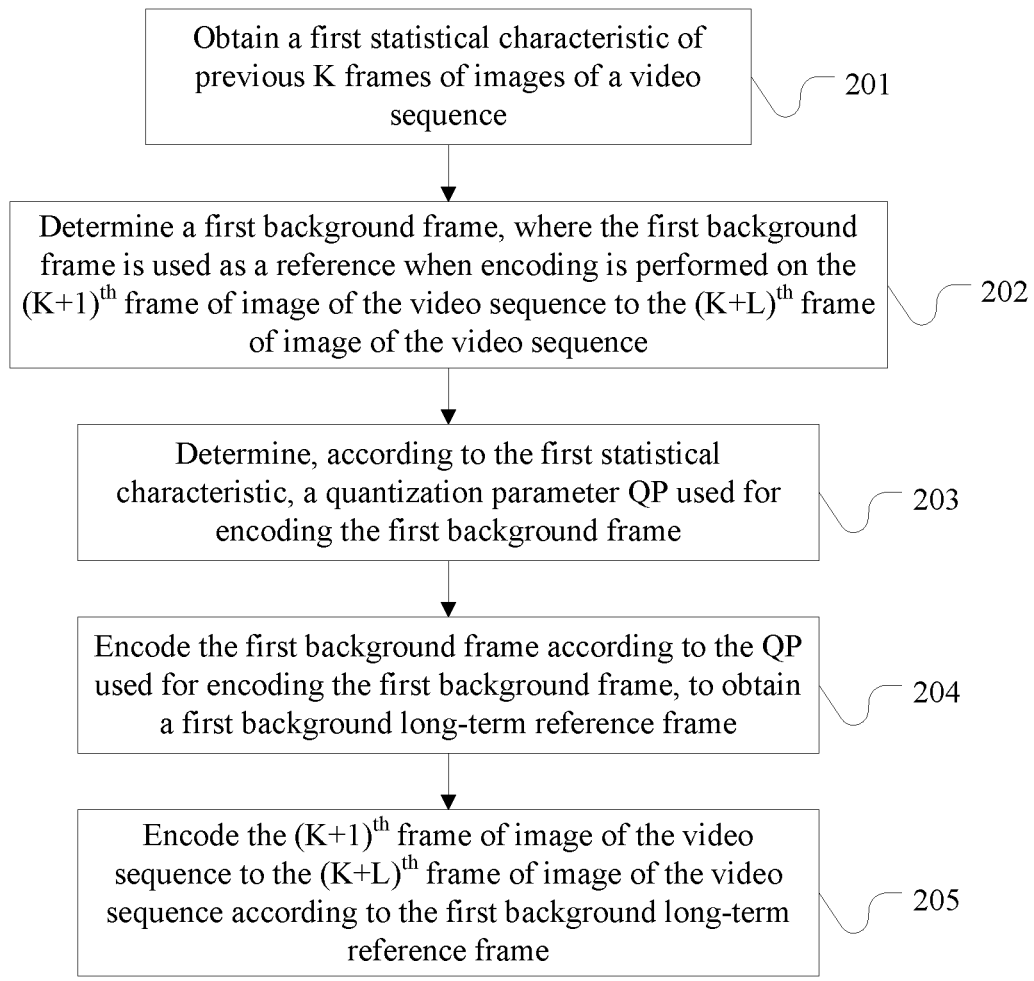
FIG. 2 is a schematic diagram of another embodiment of a video encoding method according to embodiments of the present disclosure.

Referring to FIG. 2, an embodiment of a video encoding method in the embodiments of the present disclosure includes the following steps.

201. Obtain a first statistical characteristic of previous K frames of images of a video sequence.

In this embodiment, when encoding is performed on the previous K frames of images of the video sequence, the encoding is performed according to a preconfigured short-term reference frame. The video sequence is a video sequence that is pre-obtained by a video encoding apparatus. The preconfigured short-term reference frame may be a default short-term reference frame in the HEVC standard.

K is a positive integer. The first statistical characteristic may be a video image statistical characteristic of the previous K frames of images of the video sequence. For example, the first statistical characteristic includes a variance of K centroid values corresponding to K image blocks and an average coding distortion of K coding distortions corresponding to the K image blocks. The K image blocks are image blocks located at same locations in all of the previous K frames of images. The variance of the K centroid values is a variance of a centroid value sequence constituted by the K centroid values, and the average coding distortion of the K coding distortions is an average value of a coding distortion sequence constituted by the K coding distortions. Certainly, the first statistical characteristic may alternatively include a variance of centroid values at multiple locations and an average coding distortion corresponding to the multiple locations. Each location is corresponding to K image blocks at the location in each of the previous K frames of images. In the variance of the centroid values at the multiple locations, a variance of centroid values at each location is the variance of the K centroid values corresponding to the K image blocks corresponding to the location. In the average coding distortion corresponding to the multiple locations, an average coding distortion corresponding to each location is the average coding distortion of the K coding distortions corresponding to the K image blocks. For example, the first statistical characteristic includes the variance of the K centroid values corresponding to the K image blocks corresponding to each location and the average coding distortion of the K image blocks corresponding to each location. This is not limited herein.

202. Determine a first background frame, where the first background frame is used as a reference when encoding is performed on the $(K+1)^{th}$ frame of image of the video sequence to the $(K+L)^{th}$ frame of image of the video sequence.

L is a positive integer. The first background frame, used as a long-term reference frame, is used as a reference when encoding is performed on the $(K+1)^{th}$ frame of image of the video sequence to the $(K+L)^{th}$ frame of image of the video sequence.

203. Determine, according to the first statistical characteristic, a quantization parameter (QP) used for encoding the first background frame.

Optionally, the determining, according to the first statistical characteristic, a quantization parameter (QP) used for encoding the first background frame may include: calculating, according to the first statistical characteristic, a first probability that an image block in each of the $(K+1)^{th}$ frame of image of the video sequence to the $(K+L)^{th}$ frame of image of the video sequence uses the first background frame as a reference; and calculating, according to the first probability, the QP used for encoding the first background frame.

204. Encode the first background frame according to the QP used for encoding the first background frame, to obtain a first background long-term reference frame.

205. Encode the $(K+1)^{th}$ frame of image of the video sequence to the $(K+L)^{th}$ frame of image of the video sequence according to the first background long-term reference frame.

According to this embodiment of the present disclosure, the first statistical characteristic of the previous K frames of images of the video sequence is obtained; the QP used for encoding the first background frame is determined according to the first statistical characteristic; the determined first background frame is encoded according to the QP used for encoding the first background frame, to obtain the first background long-term reference frame; and encoding is performed on the $(K+1)^{th}$ frame of image of the video sequence to the $(K+L)^{th}$ frame of image of the video sequence according to the first background long-term reference frame. In this embodiment of the present disclosure, when encoding is performed on the $(K+1)^{th}$ frame of image of the video sequence to the $(K+L)^{th}$ frame of image of the video sequence, the used quantization parameter for encoding the background long-term reference frame is determined according to the first statistical characteristic related to video content of the previous K frames of images. This improves overall video encoding quality.

In the embodiment shown in FIG. 2, the determining, according to the first statistical characteristic, a quantization parameter (QP) used for encoding the first background frame may include: calculating, according to the first statistical characteristic, a first probability that an image block in each of the $(K+1)^{th}$ frame of image of the video sequence to the $(K+L)^{th}$ frame of image of the video sequence uses the first background frame as a reference; and calculating, according to the first probability, the QP used for encoding the first background frame. There are multiple implementations of the video encoding method in this embodiment of the present disclosure. Descriptions are provided separately by using examples below.

Figure 3:
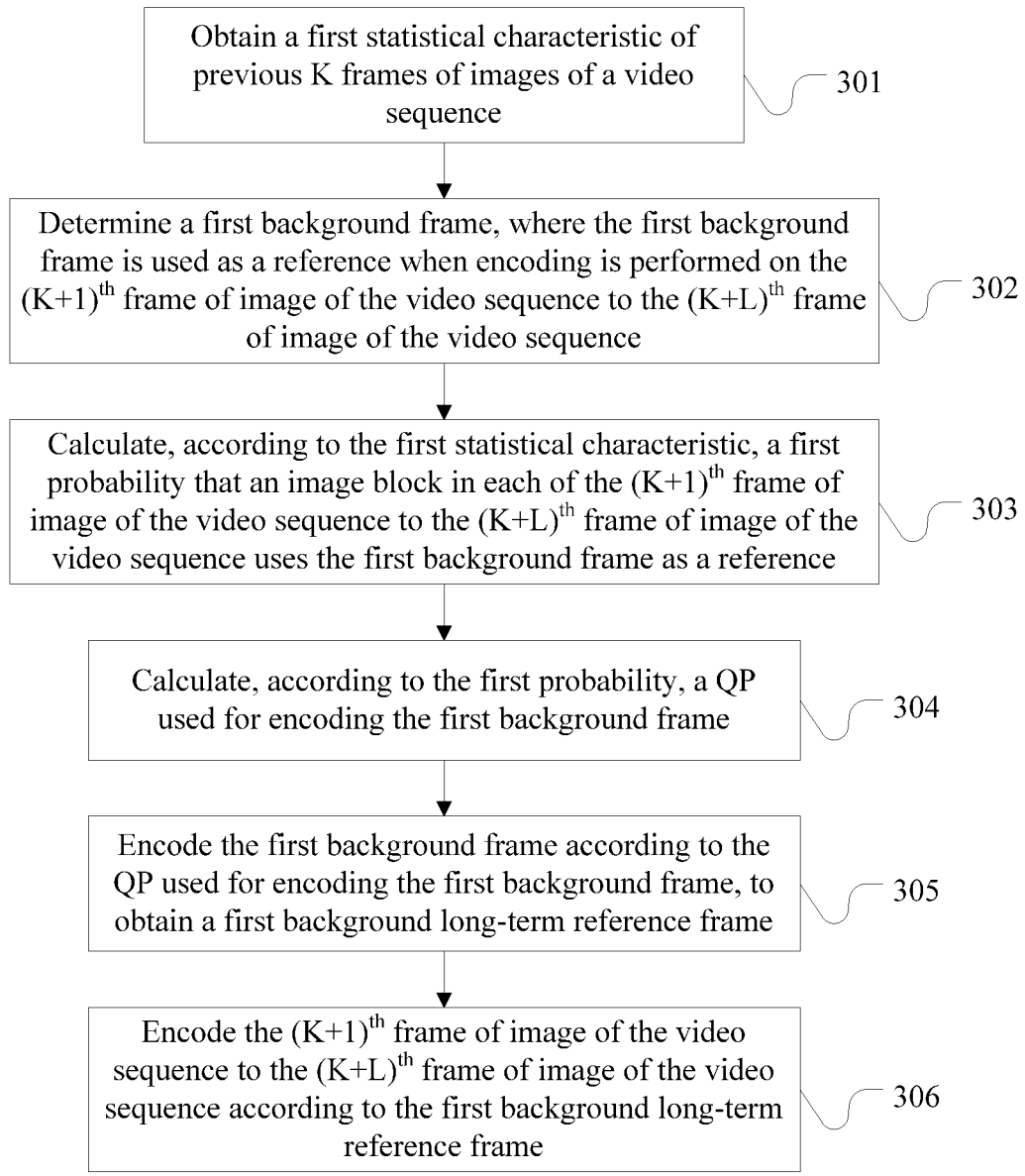
FIG. 3 is a schematic diagram of another embodiment of a video encoding method according to embodiments of the present disclosure.

Referring to FIG. 3, an embodiment of a video encoding method in the embodiments of the present disclosure includes the following steps.

301. Obtain a first statistical characteristic of previous K frames of images of a video sequence.

K is a positive integer.

In this embodiment, the first statistical characteristic includes a variance of K centroid values corresponding to K image blocks and an average coding distortion of K coding distortions corresponding to the K image blocks. The K image blocks are the $i^{th}$ image blocks in all of the previous K frames of images, where i is a positive integer. The variance of the K centroid values is a variance of a centroid value sequence constituted by the K centroid values. The average coding distortion of the K coding distortions is an average value of a coding distortion sequence constituted by the K coding distortions.

In this embodiment, there are multiple implementations of obtaining the first statistical characteristic of the previous K frames of images of the video sequence. Descriptions are provided separately below.

(1) Obtaining the first statistical characteristic of the previous K frames of images of the video sequence may include:

performing iteration calculation according to an order from the second frame of image of the previous K frames of images to the $K^{th}$ frame of image of the previous K frames of images, to obtain the variance of the K centroid values corresponding to the $i^{th}$ image blocks in all of the previous K frames of images, and the average coding distortion of the K coding distortions corresponding to the $i^{th}$ image blocks in all of the previous K frames of images, where the iteration calculation includes:

obtaining a centroid value and a coding distortion of the $i^{th}$ image block in the $j^{th}$ frame; and calculating, according to the centroid value and the coding distortion of the $i^{th}$ image block in the $j^{th}$ frame of image, a variance of j centroid values corresponding to the $i^{th}$ image blocks in all of previous j frames of images and an average coding distortion corresponding to j coding distortions corresponding to the $i^{th}$ image blocks in all of the previous j frames of images, where K≥j≥2, j is a positive integer, a variance of a centroid value of the $i^{th}$ image block of a previous frame of image is 0, and an average coding distortion of the $i^{th}$ image block in the previous frame of image is a coding distortion of the $i^{th}$ image block in the first frame of image.

The obtaining a centroid value $\omega_{j,i}$ and a coding distortion $d_{j,i}^2$ of the $i^{th}$ image block in the $j^{th}$ frame may be performed by using the following formulas (4) and (5):

$$\omega_{j,i} = \frac{1}{N_i} \sum_{m=1}^{N_i} O_{j,i}(m) \quad (4)$$

$$d_{j,i}^2 = \frac{1}{N_i} \sum_{m=1}^{N_i} (O_{j,i}(m) - r_{j,i}(m))^2 \quad (5)$$

where $\omega_{j,i}$ is a centroid value of a pixel luminance of the $i^{th}$ image block in the $j^{th}$ frame of image, $N_i$ is a quantity of pixels of the $i^{th}$ image block in the $j^{th}$ frame of image, $O_{j,i}(m)$ represents a pixel value of the $m^{th}$ pixel in the $i^{th}$ image block of the $j^{th}$ frame of image, $d_{j,i}^2$ is the coding distortion of the $i^{th}$ image block in the $j^{th}$ frame of image, $r_{j,i}(m)$ represents a reconstructed pixel value of the $m^{th}$ pixel in the $i^{th}$ image block of the $j^{th}$ frame of image, and m, i, and j are positive integers.

The calculating, according to the centroid value and the coding distortion of the $i^{th}$ image block in the $j^{th}$ frame of image, a variance of j centroid values corresponding to the $i^{th}$ image blocks in all of previous j frames of images and an average coding distortion corresponding to j coding distortions corresponding to the $i^{th}$ image blocks in all of the previous j frames of images may be performed by using the following formulas (6), (7), and (8):

$$\mu_{j,i} = \begin{cases} \omega_{j,i}, & j = 1 \\ \frac{1}{j}((j-1)\mu_{j-1,i} + \omega_{j,i}), & j > 1 \end{cases} \quad (6)$$

$$\sigma_{j,i}^2 = \begin{cases} 0, & j = 1 \\ \frac{(j-1)\sigma_{j-1,i}^2 + (\omega_{j,i} - \mu_{j-1,i})^2}{j} - (\mu_{j-1,i} - \mu_{j,i})^2, & j > 1 \end{cases} \quad (7)$$

$$e_{j,i}^2 = \begin{cases} d_{j,i}^2, & j = 1 \\ \frac{1}{j}((j-1)e_{j-1,i} + d_{j,i}^2), & j > 1 \end{cases} \quad (8)$$

where $\mu_{j,i}$ is an average value of centroid values of previous j image blocks (where the previous j image blocks are the $i^{th}$ image blocks in all of the previous j frames of images), $\mu_{j-1,i}$ is an average value of centroid values of previous j−1 image blocks, $\omega_{j,i}$ is a centroid value of the $i^{th}$ image block in the $j^{th}$ frame of image, $\sigma_{j,i}^2$ is a variance of the centroid values of the previous j image blocks, $\sigma_{j-1,i}^2$ is a variance of the centroid values of the previous j−1 image blocks, and the previous j−1 image blocks are the $i^{th}$ image blocks in all of the previous j−1 frames of images.

(2) Obtaining the first statistical characteristic of the previous K frames of images of the video sequence may alternatively include:

performing iteration calculation according to an order from the second frame of image of the previous K frames of images to the $K^{th}$ frame of image of the previous K frames of images, to obtain the variance of the K centroid values corresponding to the $i^{th}$ image blocks in all of the previous K frames of images, and the average coding distortion of the K coding distortions corresponding to the $i^{th}$ image blocks in all of the previous K frames of images, where the iteration calculation includes:

determining whether the $i^{th}$ image block in the $j^{th}$ frame of image of the video sequence belongs to a background region (that is, a region in which a motion is unobvious in an image);

when the $i^{th}$ image block in the $j^{th}$ frame of image of the video sequence belongs to the background region, obtaining, according to $B_{j,i} = B_{j-1,i} + 1$, a quantity $B_{j,i}$ of image blocks that are of previous j image blocks and that belong to the background region, where the previous j image blocks are the $i^{th}$ image blocks in all of previous j frames of images of the video sequence; and calculating, according to $B_{j,i}$, a variance of j centroid values corresponding to the $i^{th}$ image blocks in all of the previous j frames of images and an average coding distortion of j coding distortions corresponding to the $i^{th}$ image blocks in all of the previous j frames of images, where K≥j≥2, j is a positive integer, and when the $i^{th}$ image block in the first frame of image of the video sequence belongs to the background region, $B_{1,i}$ is 1, or when the $i^{th}$ image block in the first frame of image of the video sequence does not belong to the background region, $B_{1,i}$ is 0; or when the $i^{th}$ image block in the $j^{th}$ frame of image of the video sequence does not belong to the background region, obtaining, according to $B_{j,i}=B_{j-1,i}$, a quantity $B_{j,i}$ of image blocks that are of previous j image blocks and that belong to the background region, where the previous j image blocks are the $i^{th}$ image blocks in all of previous j frames of images, using a variance of j−1 centroid values corresponding to the $i^{th}$ image blocks in all of previous j−1 frames of images of the video sequence as a variance of j centroid values corresponding to the $i^{th}$ image blocks in all of the previous j frames of images, and using an average coding distortion of j−1 coding distortions corresponding to the $i^{th}$ image blocks in all of the previous j−1 frames of images of the video sequence as an average coding distortion of j coding distortions corresponding to the $i^{th}$ image blocks in all of the previous j frames of images of the video sequence, where when j is 2, the variance of the j−1 centroid values corresponding to the $i^{th}$ image blocks in all of the previous j−1 frames of images is a first preset value (for example, 0), and the average coding distortion of the j−1 coding distortions corresponding to the $i^{th}$ image blocks in all of the previous j−1 frames of images is a second preset value or a coding distortion of the first frame of image of the video sequence.

Optionally, the determining whether the $i^{th}$ image block in the $j^{th}$ frame of the video sequence belongs to a background region may include:

determining whether a horizontal component of a minimum motion vector in motion vectors of an image subblock of the $i^{th}$ image block in the $j^{th}$ frame of image is less than a first preset threshold, and whether a vertical component of the minimum motion vector is less than a second preset threshold; and when the horizontal component is less than the first preset threshold, and the vertical component is less than the second preset threshold, determining that the $i^{th}$ image block in the $j^{th}$ frame of image belongs to the background region; or when the horizontal component is not less than the first preset threshold or the vertical component is not less than the second preset threshold, determining that the $i^{th}$ image block in the $j^{th}$ frame of image does not belong to the background region.

Optionally, the first preset threshold and the second preset threshold may be the same or different. For example, both the first preset threshold and the second preset threshold may be 1; or the first preset threshold may be 0.99, and the second preset threshold may be 1.01, or the like. This is not limited herein.

Optionally, the calculating, according to $B_{j,i}$, a variance of j centroid values corresponding to the $i^{th}$ image blocks in all of the previous j frames of images and an average coding distortion of j coding distortions corresponding to the $i^{th}$ image blocks in all of the previous j frames of images may include:

obtaining a centroid value of the $i^{th}$ image block in the $j^{th}$ frame of image and a coding distortion of the $i^{th}$ image block in the $j^{th}$ frame of image;

calculating, according to the centroid value of the $i^{th}$ image block in the $j^{th}$ frame of image and $B_{j,i}$, the variance of the j centroid values corresponding to the $i^{th}$ image blocks in all of the previous j frames of images; and calculating, according to the coding distortion of the $i^{th}$ image block in the $j^{th}$ frame of image and $B_{j,i}$, the average coding distortion of the j coding distortions corresponding to the $i^{th}$ image blocks in all of the previous j frames of images.

Optionally, the calculating, according to the centroid value of the $i^{th}$ image block in the $j^{th}$ frame of image and $B_{j,i}$, the variance of the j centroid values corresponding to the $i^{th}$ image blocks in all of the previous j frames of images may include:

calculating, by using the following formulas (9) and (10), the variance of the j centroid values corresponding to the $i^{th}$ image blocks in all of the previous j frames of images:

$$\mu_{j,i} = \begin{cases} \omega_{j,i}, & B_{j,i} = 1 \\ \dfrac{1}{B_{j,i}}((B_{j,i}-1)\mu_{j-1,i} + \omega_{j,i}), & B_{j,i} > 1 \end{cases} \quad (9)$$

$$\sigma_{j,i}^2 = \begin{cases} 0, & B_{j,i} = 1 \\ \dfrac{(B_{j,i}-1)\sigma_{j-1,i}^2 + (\omega_{j,i} - \mu_{j-1,i})^2}{B_{j,i}} - (\mu_{j-1,i} - \mu_{j,i})^2, & B_{j,i} > 1 \end{cases} \quad (10)$$

where $\mu_{j,i}$ is an average value of centroid values of the previous j image blocks, $\mu_{j-1,i}$ is an average value of centroid values of the previous j−1 image blocks, $\omega_{j,i}$ is a centroid value of the $i^{th}$ image block in the $j^{th}$ frame (which may be calculated by using the foregoing formula (4)), $\sigma_{j,i}^2$ is a variance of the centroid values of the previous j image blocks, $\sigma_{j-1,i}^2$ is a variance of the centroid values of the previous j−1 image blocks, and the previous j−1 image blocks are the $i^{th}$ image blocks in all of the previous j−1 frames of images.

Optionally, the calculating, according to the coding distortion of the $i^{th}$ image block in the $j^{th}$ frame of image and $B_{j,i}$, the average coding distortion of the j coding distortions corresponding to the $i^{th}$ image blocks in all of the previous j frames of images may include:

calculating, by using the following formula (11), the average coding distortion of the j coding distortions corresponding to the $i^{th}$ image blocks in all of the previous j frames of images:

$$e_{j,i}^2 = \begin{cases} d_{j,i}^2, & B_{j,i} = 1 \\ \dfrac{1}{B_{j,i}}((B_{j,i}-1)e_{j-1,i}^2 + d_{j,i}^2), & B_{j,i} > 1 \end{cases} \quad (11)$$

where $d_{j,i}^2$ is a coding distortion of the $i^{th}$ image block in the $j^{th}$ frame (which may be obtained by using the foregoing formula (5)), $e_{j,i}^2$ is an average coding distortion of the previous j image blocks, and $e_{j-1,i}^2$ is an average coding distortion of the previous j−1 image blocks.

302. Determine a first background frame, where the first background frame is used as a reference when encoding is performed on the $(K+1)^{th}$ frame of image of the video sequence to the $(K+L)^{th}$ frame of image of the video sequence, where L is a positive integer.

L is a positive integer.

In this embodiment, there are multiple implementations of determining the first background frame. Descriptions are separately provided below.

(1) Iteration is performed on the previous K frames of images by using the following formula (12), to obtain a target iteration pixel value that is calculated according to a pixel value of the $K^{th}$ frame of image, and the target iteration pixel value is used as a pixel value of the first background frame:

$$P_{j,x,y} = \begin{cases} o_{j,x,y}, & j = 1 \\ \dfrac{1}{j}((j-1)P'_{j,x,y} + o^f_{j,x,y}), & j > 1 \end{cases} \quad (12)$$

where $P_{j,x,y}$ is an iteration pixel value that is calculated according to a pixel value at a location (x,y) in the $j^{th}$ frame of the video sequence, $P_{j,x,y}'$ is an iteration pixel value that is calculated according to a pixel value at a location (x,y) in the $(j-1)^{th}$ frame of the video sequence, and $o_{j,x,y}$ represents the pixel value at the location (x,y) in the $j^{th}$ frame of image of the video sequence.

(2) When the first statistical characteristic of the previous K frames of images of the video sequence is obtained in manner (2) in step 301, determining the first background frame may include:

performing iteration on the previous K frames of images by using the following formula (13), to obtain a target iteration pixel value that is calculated according to a pixel value of the $K^{th}$ frame of image, and using the target iteration pixel value as a pixel value of the first background frame.

$$P_{j,x,y} = \begin{cases} o_{j,x,y}, & j = 1 \\ o_{j,x,y}, B_{j,i} = 1, & j \geq 2 \\ \dfrac{1}{B_{j,i}}((B_{j,i}-1)P'_{j,x,y} + o_{j,x,y}), B_{j,i} > 1, & j \geq 2 \end{cases} \quad (13)$$

where $P_{j,x,y}$ is an iteration pixel value that is calculated according to a pixel value at a location (x,y) in the $j^{th}$ frame of the video sequence, $P_{j,x,y}'$ is an iteration pixel value that is calculated according to a pixel value at a location (x,y) in the $(j-1)^{th}$ frame of the video sequence, and $o_{j,x,y}$ represents the pixel value at the location (x,y) in the $j^{th}$ frame of image of the video sequence.

303. Calculate, according to the first statistical characteristic, a first probability that an image block in each of the $(K+1)^{th}$ frame of image of the video sequence to the $(K+L)^{th}$ frame of image of the video sequence uses the first background frame as a reference.

In this embodiment, there are multiple implementations of calculating, according to the first statistical characteristic, the first probability that the image block in each of the $(K+1)^{th}$ frame of image of the video sequence to the $(K+L)^{th}$ frame of image of the video sequence uses the first background frame as a reference. Descriptions are separately provided below.

(1) When the first statistical characteristic of the previous K frames of images of the video sequence is obtained in manner (1) in step 301, the calculating, according to the first statistical characteristic, a first probability that an image block in each of the $(K+1)^{th}$ frame of image of the video sequence to the $(K+L)^{th}$ frame of image of the video sequence uses the first background frame as a reference may include:

calculating the first probability by using the following formula (14):

$$P_i = \int_{\frac{e_i}{\sigma_i}}^{\frac{e_i}{\sigma_i}} \frac{1}{\sqrt{2\pi}} \exp\left(-\frac{x^2}{2}\right) dx \quad (14)$$

where $P_i$ is a probability that the $i^{th}$ image block in each of the $(K+1)^{th}$ frame of image of the video sequence to the $(K+L)^{th}$ frame of image of the video sequence uses the $i^{th}$ image block in the first background frame as a reference, $e_i = \sqrt{e_{K,i}^2}$, and $\sigma_i = \sqrt{\sigma_{K,i}^2}$, where $e_{K,i}^2$ is an average coding distortion of the K image blocks, $\sigma_{K,i}^2$ is a variance of the K centroid values corresponding to the K image blocks, the K image blocks are the $i^{th}$ image blocks in all of the previous K frames of images, locations of the K image blocks are corresponding to locations of the $i^{th}$ image blocks in all of the $(K+1)^{th}$ frame of image to the $(K+L)^{th}$ frame of image, the locations of the K image blocks are corresponding to a location of the $i^{th}$ image block in the first background frame, and i is a positive integer.

(2) When the first statistical characteristic of the previous K frames of images of the video sequence is obtained in manner (2) in step 301, the calculating, according to the first statistical characteristic, a first probability that an image block in each of the $(K+1)^{th}$ frame of image of the video sequence to the $(K+L)^{th}$ frame of image of the video sequence uses the first background frame as a reference may include:

calculating the first probability by using the following formula (15):

$$P_i = \int_{\frac{e_i}{\sigma_i}}^{\frac{e_i}{\sigma_i}} \frac{1}{\sqrt{2\pi}} \exp\left(-\frac{x^2}{2}\right) dx \quad (15)$$

where $P_i$ is a probability that the $i^{th}$ image block in each of the $(K+1)^{th}$ frame of image of the video sequence to the $(K+L)^{th}$ frame of image of the video sequence uses the $i^{th}$ image block in the first background frame as a reference, $$e_i \sqrt{e_{B_{K,i},i}^2},$$

and $$\sigma_i \sqrt{\sigma_{B_{K,i},i}^2},$$

where $e_{B_{K,i},i}^2$ is an average coding distortion of the K image blocks, $\sigma_{B_{K,i},i}^2$ is a variance of the K centroid values corresponding to the K image blocks, the K image blocks are the $i^{th}$ image blocks in all of the previous K frames of images, locations of the K image blocks are corresponding to locations of the $i^{th}$ image blocks in all of the $(K+1)^{th}$ frame of image to the $(K+L)^{th}$ frame of image, the locations of the K image blocks are corresponding to a location of the $i^{th}$ image block in the first background frame, and i is a positive integer.

Certainly, the first probability may be calculated by using the foregoing formula (14). This is not limited herein.

304. Calculate, according to the first probability, a QP used for encoding the first background frame.

In this embodiment, there are also multiple implementations of calculating, according to the first probability, the QP used for encoding the first background frame. Descriptions are separately provided below.

(1) When the first statistical characteristic of the previous K frames of images of the video sequence is obtained in manner (1) in step 301, the calculating, according to the first probability, a QP used for encoding the first background frame may include:

calculating, by using the following formula (16), the QP used for encoding the first background frame:

$$QP_i = \begin{cases} \max(QP_{mode} - 3\log_2(KP_i), QP_{min}), & P_i > P_T \\ QP_{mode}, & P_i \leq P_T \end{cases} \quad (16)$$

where $QP_i$ is a QP used for encoding the $i^{th}$ image block in the first background frame, $P_i$ is the probability that the $i^{th}$ image block in each of the $(K+1)^{th}$ frame of image of the video sequence to the $(K+L)^{th}$ frame of image of the video sequence uses the $i^{th}$ image block in the first background frame as a reference, $P_T$ is a preset value, $QP_{min}$ is a minimum QP value allowed by current encoding, $QP_{mode}$ is a minimum value in QPs used by image frames that are in the previous K frames of images of the video sequence and that use a same encoding mode as the first background frame, and a location of the $i^{th}$ image block in each of the $(K+1)^{th}$ frame of image to the $(K+L)^{th}$ frame of image is corresponding to the location of the $i^{th}$ image block in the first background frame.

(2) When the first statistical characteristic of the previous K frames of images of the video sequence is obtained in manner (2) in step 301, the calculating, according to the first probability, a QP used for encoding the first background frame may include:

calculating, by using the following formula (17), the QP used for encoding the first background frame:

$$QP_i = \begin{cases} \max(QP_{mode} - 3\log_2(B_{K,i}P_i), QP_{min}), & P_i > P_T \\ QP_{mode}, & P_i \leq P_T \end{cases} \quad (17)$$

where $QP_i$ is a QP used for encoding the $i^{th}$ image block in the first background frame, $P_i$ is the probability that the $i^{th}$ image block in each of the $(K+1)^{th}$ frame of image of the video sequence to the $(K+L)^{th}$ frame of image of the video sequence uses the $i^{th}$ image block in the first background frame as a reference, $P_T$ is a preset value, $QP_{min}$ is a minimum QP value allowed by current encoding, $QP_{mode}$ is a minimum value in QPs used by image frames that are in the previous K frames of images of the video sequence and that use a same encoding mode as the first background frame, and a location of the $i^{th}$ image block in each of the $(K+1)^{th}$ frame of image to the $(K+L)^{th}$ frame of image is corresponding to the location of the $i^{th}$ image block in the first background frame.

Certainly, in this case, the calculating, according to the first probability, a QP used for encoding the first background frame may include: calculating, by using the following formula (16), the QP used for encoding the first background frame. This is not limited herein.

In this embodiment, $P_T$ may be a preset value, for example, 0.05. $QP_{min}$ is the minimum QP value allowed by current encoding. For example, if the first background frame uses an I frame encoding mode, $QP_{mode}$ is a minimum QP value used by another I frame; and if the first background frame uses a P or B frame encoding mode, $QP_{mode}$ is a minimum value in QPs used by another P or B frame.

305. Encode the first background frame according to the QP used for encoding the first background frame, to obtain a first background long-term reference frame.

306. Encode the $(K+1)^{th}$ frame of image of the video sequence to the $(K+L)^{th}$ frame of image of the video sequence according to the first background long-term reference frame.

In this embodiment of the present disclosure, the first probability that the image block in each of the $(K+1)^{th}$ frame of image of the video sequence to the $(K+L)^{th}$ frame of image of the video sequence uses the determined first background frame as a reference is estimated and calculated according to a first statistical characteristic of an image sequence segment (the previous K frames of images). The QP used for encoding the first background frame is calculated according to the first probability. The first background frame is encoded according to the QP, to obtain the first background long-term reference frame used for encoding the $(K+1)^{th}$ frame of image of the video sequence to the $(K+L)^{th}$ frame of image of the video sequence. As the first background long-term reference frame is obtained by means of encoding by using the quantization parameter that is determined according to the first statistical characteristic of the previous K frames of images, impact of a video content change is taken into full account. Therefore, not only overall encoding quality of the video sequence is effectively improved, but also a bit rate increase caused by encoding of the background long-term reference frame is reduced, so that overall encoding performance is improved.

Based on the embodiment shown in FIG. 2 or FIG. 3, after the obtaining a first statistical characteristic of previous K frames of images of a video sequence, the method may further include:

obtaining a second statistical characteristic of the $(K+1)^{th}$ frame of image of the video sequence to the $(K+L)^{th}$ frame of image of the video sequence;

determining a second background frame, where the second background frame is used as a reference when encoding is performed on the $(K+L+1)^{th}$ frame of image of the video sequence to the $(K+N)^{th}$ frame of image of the video sequence, where N>L+1, and N is a positive integer;

counting a quantity of times that the $i^{th}$ image block in the first background frame is used as a reference block, where the locations of the K image blocks are corresponding to the location of the $i^{th}$ image block in the first background frame;

calculating a probability prediction error according to the first probability and the quantity of times that the $i^{th}$ image block in the first background frame is used as a reference block;

calculating, according to the second statistical characteristic, a second probability that the $(K+L+1)^{th}$ frame of image to the $(K+N)^{th}$ frame of image of the video sequence use the second background frame as a reference;

calculating, according to the second probability and the probability prediction error, a third probability that each of the $(K+L+1)^{th}$ frame of image of the video sequence to the $(K+N)^{th}$ frame of image of the video sequence uses the second background frame as a reference;

calculating, according to the third probability, a QP used for encoding the second background frame;

encoding the second background frame according to the QP used for encoding the second background frame, to obtain a second background long-term reference frame; and encoding the $(K+L+1)^{th}$ frame of image of the video sequence to the $(K+N)^{th}$ frame of image of the video sequence according to the second background long-term reference frame.

For a manner of obtaining the second statistical characteristic of the $(K+1)^{th}$ frame of image of the video sequence to the $(K+L)^{th}$ frame of image of the video sequence, reference may be made to a manner of obtaining the first statistical characteristic in step 301. Details are not described herein again.

For a manner of determining the second background frame, reference may be made to a manner in step 302. Iteration is performed on the $(K+1)^{th}$ frame of image to the $(K+L)^{th}$ frame of image of the video sequence by using the following formula (18) or (19), to obtain a target iteration pixel value that is calculated according to a pixel value of the $(K+L)^{th}$ frame of image, and the target iteration pixel value is used as a pixel value of the second background frame:

$$P_{j,x,y} = \begin{cases} o_{j,x,y}, & j = K+1 \\ \frac{1}{j}\left((j-1)P'_{j,x,y} + o^f_{j,x,y}\right), & K+L \geq j > K+1 \end{cases} \quad (18)$$

$$P_{j,x,y} = \begin{cases} o_{j,x,y}, & j = K+1 \\ o_{j,x,y}, B_{j,i} = 1, & K+L \geq j > K+1 \\ \frac{1}{B_{j,i}}\left((B_{j,i}-1)P'_{j,x,y} + o_{j,x,y}\right), B_{j,i} > 1, & K+L \geq j > K+1 \end{cases} \quad (19)$$

where $P_{j,x,y}$ is an iteration pixel value that is calculated according to a pixel value at a location (x,y) in the $j^{th}$ frame of the video sequence, $P_{j,x,y}'$ is an iteration pixel value that is calculated according to a pixel value at a location (x,y) in the $(j-1)^{th}$ frame of the video sequence, $o_{j,x,y}$ represents the pixel value at the location (x,y) in the $j^{th}$ frame of image of the video sequence, and $K+L \geq j \geq K+1$.

Calculating the probability prediction error $\Delta P_i$ according to the first probability $P_i$ and the quantity of times $S_i$ that the ith image block in the first background frame is used as a reference block may be performed by using the following formula (20):

$$\Delta P_i = S_i/K - P_i \quad (20)$$

For calculating, according to the second statistical characteristic, the second probability $P_i'$ that the $(K+L+1)^{th}$ frame of image to the $(K+N)^{th}$ frame of image of the video sequence uses the second background frame as a reference, reference may be made to a manner of calculating the first probability according to the first statistical characteristic in step 303. Details are not described herein again.

Calculating, according to the second probability $P_i'$ and the probability prediction error $\Delta P_i$, the third probability $P_i''$ that each of the $(K+L+1)^{th}$ frame of image of the video sequence to the $(K+N)^{th}$ frame of image of the video sequence uses the second background frame as a reference may be performed by using a formula $P_i'' = \Delta P_i + P_i'$.

The QP' used for encoding the second background frame is calculated according to the third probability $P_i''$. The QP' can be obtained by substituting $P_i'' = P_i$ into formula (16) or formula (17).

In this case, for a manner of encoding the second background frame according to the QP used for encoding the second background frame, to obtain the second background long-term reference frame, and encoding the $(K+L+1)^{th}$ frame of image of the video sequence to the $(K+N)^{th}$ frame of image of the video sequence according to the second background long-term reference frame, reference may also be made to the embodiment shown in FIG. 3. Details are not described herein again.

It should be noted that, the pixel value described in this embodiment of the present disclosure may include at least one of a luminance value Y, a chrominance value U, or a chrominance value V. For example, the pixel value may be a pixel value including any one, two or three of Y, U, or V. This is not limited herein.

The foregoing describes the embodiment of the video encoding method, and the following describes an embodiment of a video decoding method.

The video decoding method provided in this embodiment of the present disclosure is executed by a video decoding apparatus. The video decoding apparatus may be any apparatus that needs to output and store a video, such as a mobile phone, a notebook computer, a tablet computer, a personal computer, or another device.

Figure 4:
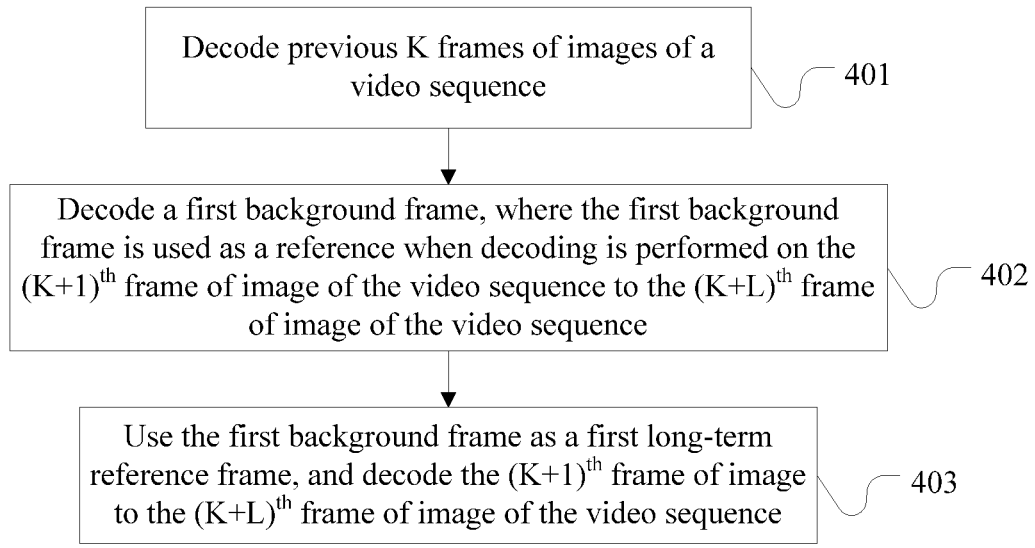
FIG. 4 is a schematic diagram of an embodiment of a video decoding method according to embodiments of the present disclosure.

Referring to FIG. 4, an embodiment of a video decoding method in the embodiments of the present disclosure includes the following content.

401. Decode previous K frames of images of a video sequence.

K is a positive integer.

Generally, when an encoder (a video encoding apparatus) writes a reference frame into a video bitstream, a reference frame parameter set and a reference frame index are generated, so that a decoder can know, according to the reference frame parameter set and the reference frame index, that a short-term reference frame and a long-term reference frame are sequentially used for decoding. The decoder (the video decoding apparatus) decodes first a reference frame that the encoder writes first, for example, a default short-term reference frame in the HEVC standard.

In this embodiment, the previous K frames of images of the video sequence may be encoded according to a preconfigured short-term reference frame (for example, the default short-term reference frame in HEVC). Therefore, a short-term reference frame decoded from a video bitstream may be used to decode the previous K frames of images of the video sequence.

402. Decode a first background frame, where the first background frame is used as a reference when encoding is performed on the $(K+1)^{th}$ frame of image of the video sequence to the $(K+L)^{th}$ frame of image of the video sequence.

L is a positive integer.

After encoding is performed on the previous K frames of images of the video sequence, decoding is performed on the first background frame that the $(K+1)^{th}$ frame of image to the $(K+L)^{th}$ frame of image of the video sequence use as a reference.

In this embodiment, the first background frame is stored in a memory of the video decoding apparatus and used as a first long-term reference frame, but is not displayed.

403. Use the first background frame as a first long-term reference frame, and decode the $(K+1)^{th}$ frame of image to the $(K+L)^{th}$ frame of image of the video sequence, where L is a positive integer.

In this embodiment of the present disclosure, as impact of a video content change is taken into full account for the encoder, encoding quality is improved, so that image decoding quality and decoding efficiency are high in video decoding in this embodiment of the present disclosure.

Optionally, after the using the first background frame as a first long-term reference frame, and decoding the $(K+1)^{th}$ frame of image to the $(K+L)^{th}$ frame of image of the video sequence, the method further includes:

decoding a second background frame, where the second background frame is used as a reference when decoding is performed on the $(K+L+1)^{th}$ frame of image to the $(K+N)^{th}$ frame of image of the video sequence, N>L+1, N is a positive integer, and similarly, the second background frame is also stored in the memory of the video decoding apparatus and used as a second long-term reference frame, but is not shown; and using the second background frame as the second long-term reference frame, and decoding the $(K+L+1)^{th}$ frame of image to the $(K+N)^{th}$ frame of image of the video sequence.

Figure 5:
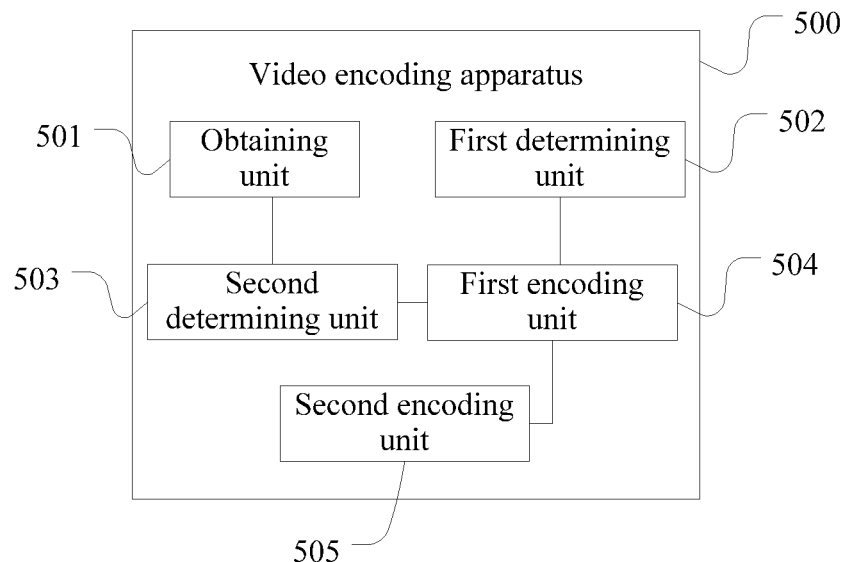
FIG. 5 is a schematic diagram of an embodiment of a video encoding apparatus according to embodiments of the present disclosure.

The following describes an embodiment of a video encoding apparatus according to the embodiments of the present disclosure. Referring to FIG. 5, the embodiment of the video encoding apparatus 500 provided in the embodiments of the present disclosure includes:

an obtaining unit 501, configured to obtain a first statistical characteristic of previous K frames of images of a video sequence, where K is a positive integer;

a first determining unit 502, configured to determine a first background frame, where the first background frame is used as a reference when encoding is performed on the $(K+1)^{th}$ frame of image of the video sequence to the $(K+L)^{th}$ frame of image of the video sequence, where L is a positive integer;

a second determining unit 503, configured to determine, according to the first statistical characteristic obtained by the obtaining unit 501, a quantization parameter (QP) used for encoding the first background frame determined by the first determining unit 502;

a first encoding unit 504, configured to encode the first background frame according to the QP determined by the second determining unit 503, to obtain a first background long-term reference frame; and a second encoding unit 505, configured to encode the $(K+1)^{th}$ frame of image of the video sequence to the $(K+L)^{th}$ frame of image of the video sequence according to the first background long-term reference frame obtained by the first encoding unit 504.

In this embodiment of the present disclosure, the obtaining unit 501 obtains the first statistical characteristic of the previous K frames of images of the video sequence; the second determining unit 503 determines, according to the first statistical characteristic, the QP used for encoding the first background frame; the first encoding unit 504 encodes the determined first background frame according to the QP used for encoding the first background frame, to obtain the first background long-term reference frame; and the second encoding unit 505 encodes the $(K+1)^{th}$ frame of image of the video sequence to the $(K+L)^{th}$ frame of image of the video sequence according to the first background long-term reference frame. In this embodiment of the present disclosure, when encoding is performed on the $(K+1)^{th}$ frame of image of the video sequence to the $(K+L)^{th}$ frame of image of the video sequence, the used quantization parameter for encoding the background long-term reference frame is determined according to the first statistical characteristic related to video content of the previous K frames of images. This improves overall video encoding quality.

In some embodiments of the present disclosure, the second determining unit 503 is configured to:

calculate, according to the first statistical characteristic, a first probability that an image block in each of the $(K+1)^{th}$ frame of image of the video sequence to the $(K+L)^{th}$ frame of image of the video sequence uses the first background frame as a reference; and calculate, according to the first probability, the QP used for encoding the first background frame.

In some embodiments of the present disclosure, the first statistical characteristic includes a variance of K centroid values corresponding to K image blocks and an average coding distortion of K coding distortions corresponding to the K image blocks.

In some embodiments of the present disclosure, the K image blocks are the $i^{th}$ image blocks in all of the previous K frames of images, where i is a positive integer, the K image blocks are image blocks located at same locations in all of the previous K frames of images, the variance of the K centroid values is a variance of a centroid value sequence constituted by the K centroid values, and the average coding distortion of the K coding distortions is an average value of a coding distortion sequence constituted by the K coding distortions.

The obtaining unit 501 is configured to:

perform iteration calculation according to an order from the second frame of image of the previous K frames of images to the $K^{th}$ frame of image of the previous K frames of images, to obtain the variance of the K centroid values corresponding to the $i^{th}$ image blocks in all of the previous K frames of images, and the average coding distortion of the K coding distortions corresponding to the $i^{th}$ image blocks in all of the previous K frames of images, where the iteration calculation includes:

determining whether the $i^{th}$ image block in the $j^{th}$ frame of image of the video sequence belongs to a background region; and when the $i^{th}$ image block in the $j^{th}$ frame of image of the video sequence belongs to the background region, obtaining, according to $B_{j,i}=B_{j-1,i}+1$, a quantity $B_{j,i}$ of image blocks that are of previous j image blocks and that belong to the background region, where the previous j image blocks are the $i^{th}$ image blocks in all of previous j frames of images of the video sequence; and calculating, according to $B_{j,i}$, a variance of j centroid values corresponding to the $i^{th}$ image blocks in all of the previous j frames of images and an average coding distortion of j coding distortions corresponding to the $i^{th}$ image blocks in all of the previous j frames of images, where K≥j≥2, j is a positive integer, and when the $i^{th}$ image block in the first frame of image of the video sequence belongs to the background region, $B_{1,i}$ is 1, or when the $i^{th}$ image block in the first frame of image of the video sequence does not belong to the background region, $B_{1,i}$ is 0; or when the $i^{th}$ image block in the $j^{th}$ frame of image of the video sequence does not belong to the background region, obtaining, according to $B_{j,i}=B_{j-1,i}$, a quantity $B_{j,i}$ of image blocks that are of previous j image blocks and that belong to the background region, where the previous j image blocks are the $i^{th}$ image blocks in all of previous j frames of images, using a variance of j−1 centroid values corresponding to the $i^{th}$ image blocks in all of previous j−1 frames of images of the video sequence as a variance of j centroid values corresponding to the $i^{th}$ image blocks in all of the previous j frames of images, and using an average coding distortion of j−1 coding distortions corresponding to the $i^{th}$ image blocks in all of the previous j−1 frames of images of the video sequence as an average coding distortion of j coding distortions corresponding to the $i^{th}$ image blocks in all of the previous j frames of images of the video sequence, where when j is 2, the variance of the j−1 centroid values corresponding to the $i^{th}$ image blocks in all of the previous j−1 frames of images is a first preset value, and the average coding distortion of the j−1 coding distortions corresponding to the $i^{th}$ image blocks in all of the previous j−1 frames of images is a second preset value or a coding distortion of the first frame of image of the video sequence.

In some embodiments of the present disclosure, the obtaining unit 501 is configured to: determine whether a horizontal component of a minimum motion vector in motion vectors of an image subblock of the $i^{th}$ image block in the $j^{th}$ frame of image is less than a first preset threshold, and whether a vertical component of the minimum motion vector is less than a second preset threshold; and when the horizontal component is less than the first preset threshold, and the vertical component is less than the second preset threshold, determine that the $i^{th}$ image block in the $j^{th}$ frame of image belongs to the background region; or when the horizontal component is not less than the first preset threshold or the vertical component is not less than the second preset threshold, determine that the $i^{th}$ image block in the $j^{th}$ frame of image does not belong to the background region.

In some embodiments of the present disclosure, the obtaining unit 501 is configured to: obtain a centroid value of the $i^{th}$ image block in the $j^{th}$ frame of image and a coding distortion of the $i^{th}$ image block in the $j^{th}$ frame of image; calculate, according to the centroid value of the $i^{th}$ image block in the $j^{th}$ frame of image and $B_{j,i}$, the variance of the j centroid values corresponding to the $i^{th}$ image blocks in all of the previous j frames of images; and calculate, according to the coding distortion of the $i^{th}$ image block in the $j^{th}$ frame of image and $B_{j,i}$, the average coding distortion of the j coding distortions corresponding to the $i^{th}$ image blocks in all of the previous j frames of images.

In some embodiments of the present disclosure, the obtaining unit 501 is configured to calculate, by using the foregoing formulas (9) and (10), the variance of the j centroid values corresponding to the $i^{th}$ image blocks in all of the previous j frames of images.

In some embodiments of the present disclosure, the obtaining unit 501 is configured to calculate, by using the foregoing formula (11), the average coding distortion of the j coding distortions corresponding to the $i^{th}$ image blocks in all of the previous j frames of images.

In some embodiments of the present disclosure, the second determining unit 503 is configured to calculate the first probability by using the foregoing formula (15).

In some embodiments of the present disclosure, the second determining unit 503 is configured to calculate the first probability by using the foregoing formula (14).

In some embodiments of the present disclosure, the second determining unit 503 is configured to calculate, by using the foregoing formula (16), the QP used for encoding the first background frame.

In some embodiments of the present disclosure, the second determining unit 503 is configured to calculate, by using the foregoing formula (17), the QP used for encoding the first background frame.

In some embodiments of the present disclosure, the first determining unit 502 is configured to perform iteration on the previous K frames of images by using the foregoing formula (13), to obtain a target iteration pixel value that is calculated according to a pixel value of the $K^{th}$ frame of image, and use the target iteration pixel value as a pixel value of the first background frame.

In some embodiments of the present disclosure, the obtaining unit 501 is further configured to obtain a second statistical characteristic of the $(K+1)^{th}$ frame of image of the video sequence to the $(K+L)^{th}$ frame of image of the video sequence.

The first determining unit 502 is further configured to determine a second background frame. The second background frame is used as a reference when encoding is performed on the $(K+L+1)^{th}$ frame of image of the video sequence to the $(K+N)^{th}$ frame of image of the video sequence, where N>L+1, and N is a positive integer.

The second determining unit 503 is further configured to: count a quantity of times that the $i^{th}$ image block in the first background frame is used as a reference block, where locations of the locations of the K image blocks are corresponding to a location of the $i^{th}$ image block in the first background frame; calculate a probability prediction error according to the first probability and the quantity of times that the $i^{th}$ image block in the first background frame is used as a reference block; calculate, according to the second statistical characteristic obtained by the obtaining unit, a second probability that the $(K+L+1)^{th}$ frame of image to the $(K+N)^{th}$ frame of image of the video sequence use the second background frame as a reference, where the second background frame is determined by the first determining unit; calculate, according to the second probability and the probability prediction error, a third probability that each of the $(K+L+1)^{th}$ frame of image of the video sequence to the $(K+N)^{th}$ frame of image of the video sequence uses the second background frame as a reference; and calculate, according to the third probability, a QP used for encoding the second background frame.

The first encoding unit 504 is further configured to encode the second background frame according to the QP used for encoding the second background frame, to obtain a second background long-term reference frame, where the QP is determined by the second determining unit 503.

The second encoding unit 505 is further configured to encode the $(K+L+1)^{th}$ frame of image of the video sequence to the $(K+N)^{th}$ frame of image of the video sequence according to the second background long-term reference frame obtained by the first encoding unit 504.

Figure 6:
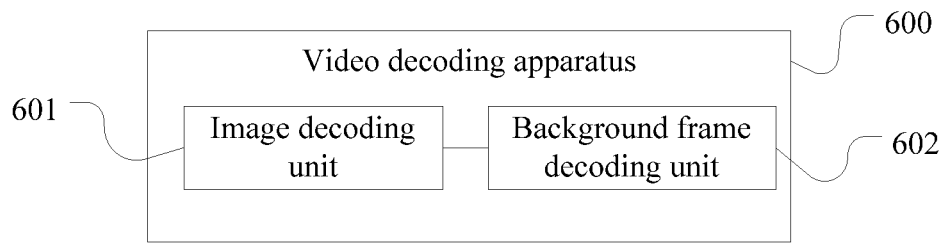
FIG. 6 is a schematic diagram of an embodiment of a video decoding apparatus according to embodiments of the present disclosure.

The following describes an embodiment of a video decoding apparatus according to the embodiments of the present disclosure. Referring to FIG. 6, the embodiment of the video encoding apparatus 600 provided in the embodiments of the present disclosure includes:

an image decoding unit 601, configured to decode previous K frames of images of a video sequence, where K is a positive integer; and a background frame decoding unit 602, configured to decode a first background frame, where the first background frame is used as a reference when decoding is performed on the $(K+1)^{th}$ frame of image of the video sequence to the $(K+L)^{th}$ frame of image of the video sequence, where L is a positive integer, where the image decoding unit 601 is further configured to: use the first background frame, obtained by the background frame decoding unit 602, as a first long-term reference frame, and decode the $(K+1)^{th}$ frame of image to the $(K+L)^{th}$ frame of image of the video sequence, where L is a positive integer.

In some embodiments of the present disclosure, the background frame decoding unit 602 is further configured to decode a second background frame. The second background frame is used as a reference when decoding is performed on the $(K+L+1)^{th}$ frame of image to the $(K+N)^{th}$ frame of image of the video sequence, where N>L+1, and N is a positive integer.

The image decoding unit 601 is further configured to: use the second background frame, obtained by the background frame decoding unit 602, as a second long-term reference frame, and decode the $(K+L+1)^{th}$ frame of image to the $(K+N)^{th}$ frame of image of the video sequence.

Figure 7:
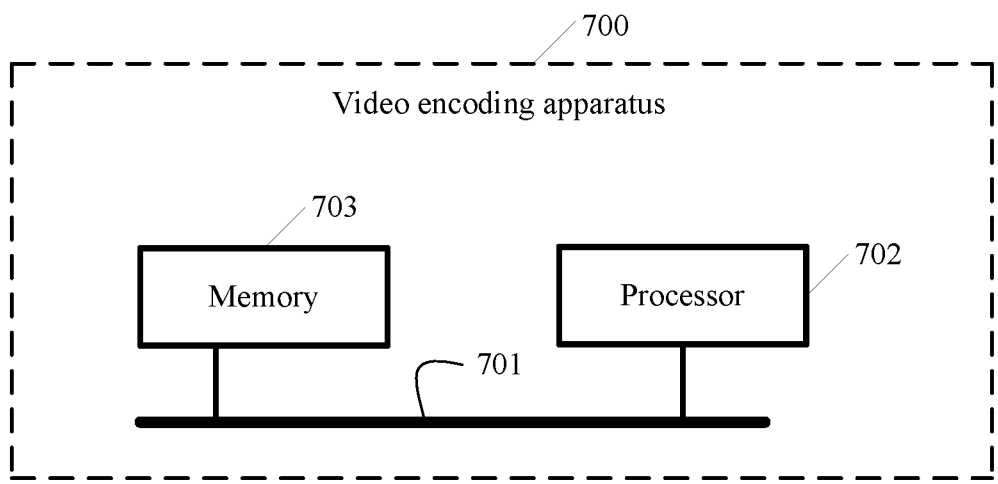
FIG. 7 is a schematic diagram of another embodiment of a video encoding apparatus according to embodiments of the present disclosure.

The following describes a specific possible embodiment of a video encoding apparatus according to embodiments of the present disclosure. Referring to FIG. 7, FIG. 7 is a schematic diagram of the video encoding apparatus 700 provided in this embodiment of the present disclosure. The video encoding apparatus 700 may include at least one bus 701, at least one processor 702 connected to the bus 701, and at least one memory 703 connected to the bus 701.

The processor 702 invokes, by using the bus 701, code stored in the memory 703, so as to: obtain a first statistical characteristic of previous K frames of images of the video sequence, where K is a positive integer; determine a first background frame, where the first background frame is used as a reference when encoding is performed on the $(K+1)^{th}$ frame of image of the video sequence to the $(K+L)^{th}$ frame of image of the video sequence, where L is a positive integer; determine, according to the first statistical characteristic, a quantization parameter (QP) used for encoding the first background frame; encode the first background frame according to the QP used for encoding the first background frame, to obtain a first background long-term reference frame; and encode the $(K+1)^{th}$ frame of image of the video sequence to the $(K+L)^{th}$ frame of image of the video sequence according to the first background long-term reference frame.

In some embodiments of the present disclosure, the processor 702 invokes, by using the bus 701, the code stored in the memory 703, so as to calculate, according to the first statistical characteristic, a first probability that an image block in each of the $(K+^t)^{th}$ frame of image of the video sequence to the $(K+L)^{th}$ frame of image of the video sequence uses the first background frame as a reference; and calculate, according to the first probability, the QP used for encoding the first background frame.

In some embodiments of the present disclosure, the first statistical characteristic includes a variance of K centroid values corresponding to K image blocks and an average coding distortion of K coding distortions corresponding to the K image blocks. The K image blocks are image blocks located at same locations in all of the previous K frames of images. The variance of the K centroid values is a variance of a centroid value sequence constituted by the K centroid values. The average coding distortion of the K coding distortions is an average value of a coding distortion sequence constituted by the K coding distortions.

In some embodiments of the present disclosure, the K image blocks are the $i^{th}$ image blocks in all of the previous K frames of images, where i is a positive integer.

The processor 702 invokes, by using the bus 701, the code stored in the memory 703, so as to: perform iteration calculation according to an order from the second frame of image of the previous K frames of images to the $K^{th}$ frame of image of the previous K frames of images, to obtain the variance of the K centroid values corresponding to the $i^{th}$ image blocks in all of the previous K frames of images, and the average coding distortion of the K coding distortions corresponding to the $i^{th}$ image blocks in all of the previous K frames of images, where the iteration calculation includes:

determining whether the $i^{th}$ image block in the $j^{th}$ frame of image of the video sequence belongs to a background region; and when the $i^{th}$ image block in the $j^{th}$ frame of image of the video sequence belongs to the background region, obtaining, according to $B_{j,i}=B_{j-1,i}+1$, a quantity $B_{j,i}$ of image blocks that are of previous j image blocks and that belong to the background region, where the previous j image blocks are the $i^{th}$ image blocks in all of previous j frames of images of the video sequence; and calculating, according to $B_{j,i}$, a variance of j centroid values corresponding to the $i^{th}$ image blocks in all of the previous j frames of images and an average coding distortion of j coding distortions corresponding to the $i^{th}$ image blocks in all of the previous j frames of images, where K≥j≥2, j is a positive integer, and when the $i^{th}$ image block in the first frame of image of the video sequence belongs to the background region, $B_{1,i}$ is 1, or when the $i^{th}$ image block in the first frame of image of the video sequence does not belong to the background region, $B_{1,i}$ is 0; or when the $i^{th}$ image block in the $j^{th}$ frame of image of the video sequence does not belong to the background region, obtaining, according to $B_{j,i}=B_{j-1,i}$, a quantity $B_{j,i}$ of image blocks that are of previous j image blocks and that belong to the background region, where the previous j image blocks are the $i^{th}$ image blocks in all of previous j frames of images, using a variance of j−1 centroid values corresponding to the $i^{th}$ image blocks in all of previous j−1 frames of images of the video sequence as a variance of j centroid values corresponding to the $i^{th}$ image blocks in all of the previous j frames of images, and using an average coding distortion of j−1 coding distortions corresponding to the $i^{th}$ image blocks in all of the previous j−1 frames of images of the video sequence as an average coding distortion of j coding distortions corresponding to the $i^{th}$ image blocks in all of the previous j frames of images of the video sequence, where when j is 2, the variance of the j−1 centroid values corresponding to the $i^{th}$ image blocks in all of the previous j−1 frames of images is a first preset value, and the average coding distortion of the j−1 coding distortions corresponding to the $i^{th}$ image blocks in all of the previous j−1 frames of images is a second preset value or a coding distortion of the first frame of image of the video sequence.

In some embodiments of the present disclosure, the processor 702 invokes, by using the bus 701, the code stored in the memory 703, so as to:

determine whether a minimum motion vector in motion vectors of an image subblock of the $i^{th}$ image block in the $j^{th}$ frame of image meets the following condition: A horizontal component of the minimum motion vector is less than a first preset threshold, and a vertical component of the minimum motion vector is less than a second preset threshold; and when the horizontal component is less than the first preset threshold, and the vertical component is less than the second preset threshold, determine that the $i^{th}$ image block in the $j^{th}$ frame of image belongs to the background region; or when the horizontal component is not less than the first preset threshold or the vertical component is not less than the second preset threshold, determine that the $i^{th}$ image block in the $j^{th}$ frame of image does not belong to the background region.

In some other embodiments of the present disclosure, the processor 702 invokes, by using the bus 701, the code stored in the memory 703, so as to:

obtain a centroid value of the $i^{th}$ image block in the $j^{th}$ frame of image and a coding distortion of the $i^{th}$ image block in the $j^{th}$ frame of image;

calculate, according to the centroid value of the $i^{th}$ image block in the $j^{th}$ frame of image and $B_{j,i}$, the variance of the j centroid values corresponding to the $i^{th}$ image blocks in all of the previous j frames of images; and calculate, according to the coding distortion of the $i^{th}$ image block in the $j^{th}$ frame of image and $B_{j,i}$, the average coding distortion of the j coding distortions corresponding to the $i^{th}$ image blocks in all of the previous j frames of images.

In some embodiments of the present disclosure, the processor 702 invokes, by using the bus 701, the code stored in the memory 703, so as to:

calculate, by using the foregoing formulas (9) and (10), the variance of the j centroid values corresponding to the $i^{th}$ image blocks in all of the previous j frames of images.

In some embodiments of the present disclosure, the processor 702 invokes, by using the bus 701, the code stored in the memory 703, so as to:

calculate, by using the foregoing formula (11), the average coding distortion of the j coding distortions corresponding to the $i^{th}$ image blocks in all of the previous j frames of images.

In some embodiments of the present disclosure, the processor 702 invokes, by using the bus 701, the code stored in the memory 703, so as to:

calculate the first probability by using the foregoing formula (15).

In some embodiments of the present disclosure, the processor 702 invokes, by using the bus 701, the code stored in the memory 703, so as to:

calculate the first probability by using the foregoing formula (14).

In some embodiments of the present disclosure, the processor 702 invokes, by using the bus 701, the code stored in the memory 703, so as to:

calculate, by using the foregoing formula (16), the QP used for encoding the first background frame.

In some embodiments of the present disclosure, the processor 702 invokes, by using the bus 701, the code stored in the memory 703, so as to:

calculate, by using the foregoing formula (17), the QP used for encoding the first background frame.

In some embodiments of the present disclosure, that the processor 702 invokes, by using the bus 701, the code stored in the memory 703, so as to determine the first background frame includes:

performing iteration on the previous K frames of images by using the foregoing formula (13), to obtain a target iteration pixel value that is calculated according to a pixel value of the $K^{th}$ frame of image, and using the target iteration pixel value as a pixel value of the first background frame.

In some embodiments of the present disclosure, after the processor 702 obtains the first statistical characteristic of the previous K frames of images of the video sequence, the processor 702 invokes, by using the bus 701, the code stored in the memory 703, so as to further:

obtain a second statistical characteristic of the $(K+1)^{th}$ frame of image of the video sequence to the $(K+L)^{th}$ frame of image of the video sequence;

determine a second background frame, where the second background frame is used as a reference when encoding is performed on the $(K+L+1)^{th}$ frame of image of the video sequence to the $(K+N)^{th}$ frame of image of the video sequence, where N>L+1, and N is a positive integer;

count a quantity of times that the $i^{th}$ image block in the first background frame is used as a reference block, where locations of the locations of the K image blocks are corresponding to a location of the $i^{th}$ image block in the first background frame;

calculate a probability prediction error according to the first probability and the quantity of times that the $i^{th}$ image block in the first background frame is used as a reference block;

calculate, according to the second statistical characteristic, a second probability that the $(K+L+1)^{th}$ frame of image to the $(K+N)^{th}$ frame of image of the video sequence use the second background frame as a reference;

calculate, according to the second probability and the probability prediction error, a third probability that each of the $(K+L+1)^{th}$ frame of image of the video sequence to the $(K+N)^{th}$ frame of image of the video sequence uses the second background frame as a reference;

calculate, according to the third probability, a QP used for encoding the second background frame;

encode the second background frame according to the QP used for encoding the second background frame, to obtain a second background long-term reference frame; and encode the $(K+L+1)^{th}$ frame of image of the video sequence to the $(K+N)^{th}$ frame of image of the video sequence according to the second background long-term reference frame.

It can be understood that functions of functional modules of the video encoding apparatus 700 in this embodiment can be implemented according to the method in the foregoing method embodiments. For a specific implementation process, refer to related description in the foregoing method embodiments. Details are not described again herein. The video encoding apparatus 700 may be any apparatus that needs to output and play a video, such as a notebook computer, a tablet computer, a personal computer, a mobile phone, or another device.

Figure 8:
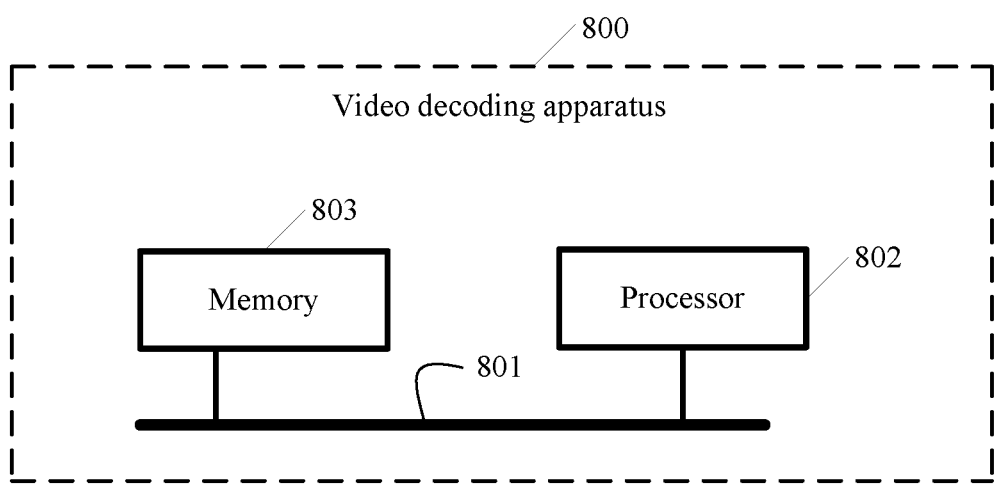
FIG. 8 is a schematic diagram of another embodiment of a video decoding apparatus according to embodiments of the present disclosure.

The following describes a specific possible embodiment of a video decoding apparatus according to embodiments of the present disclosure. Referring to FIG. 8, FIG. 8 is a schematic diagram of the video decoding apparatus 800 provided in this embodiment of the present disclosure. The video decoding apparatus 800 may include at least one bus 801, at least one processor 802 connected to the bus 801, and at least one memory 803 connected to the bus 801.

The processor 802 invokes, by using the bus 801, code stored in the memory 803, so that the processor 802 is configured to: decode previous K frames of images of a video sequence, where K is a positive integer; decode a first background frame, where the first background frame is used as a reference when decoding is performed on the $(K+1)^{th}$ frame of image of the video sequence to the $(K+L)^{th}$ frame of image of the video sequence, where L is a positive integer; and use the first background frame as a first long-term reference frame, and decode the $(K+1)^{th}$ frame of image to the $(K+L)^{th}$ frame of image of the video sequence, where L is a positive integer.

In some embodiments of the present disclosure, after the using the first background frame as a long-term reference frame, and decoding the $(K+1)^{th}$ frame of image to the $(K+L)^{th}$ frame of image of the video sequence, so that the processor 802 is further configured s: decode a second background frame, where the second background frame is used as a reference when encoding is performed on the $(K+L+1)^{th}$ frame of image of the video sequence to the $(K+N)^{th}$ frame of image, where N>L+1, and N is a positive integer; and use the second background frame as a second long-term reference frame, and decode the $(K+L+1)^{th}$ frame of image to the $(K+N)^{th}$ frame of image of the video sequence.

It can be understood that functions of functional modules of the video decoding apparatus 800 in this embodiment can be implemented according to the method in the foregoing method embodiments. For a specific implementation process, refer to related description in the foregoing method embodiments. Details are not described again herein. The video decoding apparatus 800 may be any apparatus that needs to output and play a video, such as a notebook computer, a tablet computer, a personal computer, a mobile phone, or another device.

It may be clearly understood by persons skilled in the art that, for ease of convenient and brief description, for a detailed working process of the foregoing system, apparatus, and unit, refer to a corresponding process in the foregoing method embodiments, and details are not described herein again.

An embodiment of the present disclosure further provides a computer storage medium. The computer storage medium may store a program, and when the program is executed, some or all steps of at least the video encoding method or the video decoding method recorded in the foregoing method embodiments are executed.

In the foregoing embodiments, the description of each embodiment has respective focuses. For a part that is not described in detail in an embodiment, refer to related description in other embodiments.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between some interfaces, apparatuses, or units, and may be implemented in electrical, mechanical, or other forms.

The units described as separate parts may or may not be physically separate. Parts displayed as units may or may not be physical units, and may be located in one position or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the conventional art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A video encoding method, comprising:
    obtaining a first statistical characteristic of previous K frames of images of a video sequence, wherein K is a positive integer;
    determining a first background frame, wherein the first background frame is used as a reference when encoding is performed on the $(K+1)^{th}$ frame of image of the video sequence to the $(K+L)^{th}$ frame of image of the video sequence, wherein L is a positive integer;
    determining, according to the first statistical characteristic, a quantization parameter (QP) used for encoding the first background frame;
    encoding the first background frame according to the QP, to obtain a first background long-term reference frame; and
    encoding the $(K+1)^{th}$ frame of image of the video sequence to the $(K+L)^{th}$ frame of image of the video sequence according to the first background long-term reference frame.

2. The method according to claim 1, wherein determining the QP used for encoding the first background frame comprises:
    obtaining, according to the first statistical characteristic, a first probability that an image block in each of the $(K+1)^{th}$ frame of image of the video sequence to the $(K+L)^{th}$ frame of image of the video sequence uses the first background frame as a reference; and
    obtaining, according to the first probability, the QP used for encoding the first background frame.

3. The method according to claim 1, wherein the first statistical characteristic comprises a variance of K centroid values corresponding to K image blocks and an average coding distortion of K coding distortions corresponding to the K image blocks, wherein the K image blocks are image blocks located at same locations in all of the previous K frames of images, the variance of the K centroid values is a variance of a centroid value sequence constituted by the K centroid values, and the average coding distortion of the K coding distortions is an average value of a coding distortion sequence constituted by the K coding distortions.

4. The method according to claim 3, wherein
    the K image blocks are the $i^{th}$ image blocks in all of the previous K frames of images, wherein i is a positive integer; and
    wherein obtaining the first statistical characteristic of the previous K frames of images of the video sequence comprises:
    performing iteration calculation according to an order from the second frame of image of the previous K frames of images to the $K^{th}$ frame of image of the previous K frames of images, to obtain the variance of the K centroid values corresponding to the $i^{th}$ image blocks in all of the previous K frames of images, and the average coding distortion of the K coding distortions corresponding to the $i^{th}$ image blocks in all of the previous K frames of images, wherein the iteration calculation comprises:
    determining whether the $i^{th}$ image block in the $j^{th}$ frame of image of the video sequence belongs to a background region; and
    when the $i^{th}$ image block in the $j^{th}$ frame of image of the video sequence belongs to the background region, obtaining, according to $B_{j,i}=B_{j-1,i}+1$, a quantity $B_{j,i}$ of image blocks that are of previous j image blocks and that belong to the background region, wherein the previous j image blocks are the $i^{th}$ image blocks in all of previous j frames of images of the video sequence; and obtaining, according to $B_{j,i}$, a variance of j centroid values corresponding to the $i^{th}$ image blocks in all of the previous j frames of images and an average coding distortion of j coding distortions corresponding to the $i^{th}$ image blocks in all of the previous j frames of images, wherein K≥j≥2, and when the $i^{th}$ image block in the first frame of image of the video sequence belongs to the background region, $B_{1,i}$ is 1, or when the $i^{th}$ image block in the first frame of image of the video sequence does not belong to the background region, $B_{1,i}$ is 0; or when the $i^{th}$ image block in the $j^{th}$ frame of image of the video sequence does not belong to the background region, obtaining, according to $B_{j,i}=B_{j-1,i}$, a quantity $B_{j,i}$ of image blocks that are of previous j image blocks and that belong to the background region, wherein the previous j image blocks are the $i^{th}$ image blocks in all of previous j frames of images, using a variance of j−1 centroid values corresponding to the $i^{th}$ image blocks in all of previous j−1 frames of images of the video sequence as a variance of j centroid values corresponding to the $i^{th}$ image blocks in all of the previous j frames of images, and using an average coding distortion of j−1 coding distortions corresponding to the $i^{th}$ image blocks in all of the previous j−1 frames of images of the video sequence as an average coding distortion of j coding distortions corresponding to the $i^{th}$ image blocks in all of the previous j frames of images of the video sequence, wherein when j is 2, the variance of the j−1 centroid values corresponding to the $i^{th}$ image blocks in all of the previous j−1 frames of images is a first preset value, and the average coding distortion of the j−1 coding distortions corresponding to the $i^{th}$ image blocks in all of the previous j−1 frames of images is a second preset value or a coding distortion of the first frame of image of the video sequence.

5. The method according to claim 4, wherein determining whether the $i^{th}$ image block in the $j^{th}$ frame of image of the video sequence belongs to the background region comprises:

determining whether a horizontal component of a minimum motion vector in motion vectors of an image subblock of the $i^{th}$ image block in the $j^{th}$ frame of image is less than a first preset threshold, and whether a vertical component of the minimum motion vector is less than a second preset threshold; and when the horizontal component is less than the first preset threshold, and the vertical component is less than the second preset threshold, determining that the $i^{th}$ image block in the $j^{th}$ frame of image belongs to the background region; or when the horizontal component is not less than the first preset threshold or the vertical component is not less than the second preset threshold, determining that the $i^{th}$ image block in the $j^{th}$ frame of image does not belong to the background region.

6. The method according to claim 4, wherein obtaining, according to $B_{j,i}$, a variance of j centroid values and the average coding distortion of j coding distortions comprises:

obtaining a centroid value and a coding distortion of the $i^{th}$ image block in the $j^{th}$ frame of image;

obtaining, according to the centroid value of the $i^{th}$ image block in the $j^{th}$ frame of image and $B_{j,i}$, the variance of the j centroid values corresponding to the $i^{th}$ image blocks in all of the previous j frames of images; and obtaining, according to the coding distortion of the $i^{th}$ image block in the $j^{th}$ frame of image and $B_{j,i}$, the average coding distortion of the j coding distortions corresponding to the $i^{th}$ image blocks in all of the previous j frames of images.

7. The method according to claim 6, wherein the average coding distortion of the j coding distortions corresponding to the $i^{th}$ image blocks in all of the previous j frames of images is obtained through the following:

$$e_{j,i}^2 = \begin{cases} d_{j,i}^2, & B_{j,i} = 1 \\ \dfrac{1}{B_{j,i}}((B_{j,i}-1)e_{j-1,i}^2 + d_{j,i}^2), & B_{j,i} > 1 \end{cases},$$

wherein $d_{j,i}^2$ is a coding distortion of the $i^{th}$ image block in the $j^{th}$ frame of image, $e_{j,i}^2$ is an average coding distortion of the previous j image blocks, and $e_{j-1,i}^2$ is an average coding distortion of the previous j−1 image blocks.

8. The method according to claim 4, wherein the first probability is obtained through the following:

$$P_i = \int_{\frac{e_i}{\sigma_i}}^{\frac{e_i}{\sigma_i}} \frac{1}{\sqrt{2\pi}} \exp\left(-\frac{x^2}{2}\right) dx,$$

wherein $P_i$ is a probability that the $i^{th}$ image block in each of the $(K+1)^{th}$ frame of image of the video sequence to the $(K+L)^{th}$ frame of image of the video sequence uses the $i^{th}$ image block in the first background frame as a reference, $$e_i \sqrt{e_{B_{K,i},i}^2},$$

and $$\sigma_i \sqrt{\sigma_{B_{K,i},i}^2},$$

wherein $e_{B_{K,i},i}^2$ is an average coding distortion of the K image blocks, $\sigma_{B_{K,i},i}^2$ is a variance of the K centroid values corresponding to the K image blocks, the K image blocks are the $i^{th}$ image blocks in all of the previous K frames of images, locations of the K image blocks correspond to locations of the $i^{th}$ image blocks in all of the $(K+1)^{th}$ frame of image to the $(K+L)^{th}$ frame of image, the locations of the K image blocks correspond to a location of the $i^{th}$ image block in the first background frame, and i is a positive integer.

9. The method according to claim 2, wherein the QP used for encoding the first background frame is obtained through the following:

$$QP_i = \begin{cases} \max(QP_{mode} - 3\log_2(KP_i), QP_{min}), & P_i > P_T \\ QP_{mode}, & P_i \le P_T \end{cases},$$

wherein $QP_i$ is a QP used for encoding the $i^{th}$ image block in the first background frame, $P_i$ is the probability that the $i^{th}$ image block in each of the $(K+1)^{th}$ frame of image of the video sequence to the $(K+L)^{th}$ frame of image of the video sequence uses the $i^{th}$ image block in the first background frame as a reference, $P_T$ is a preset value, $QP_{min}$ is a minimum QP value allowed by current encoding operation, $QP_{mode}$ is a minimum value in QPs used by image frames that are in the previous K frames of images of the video sequence and that use a same encoding mode as the first background frame, and a location of the $i^{th}$ image block in each of the $(K+1)^{th}$ frame of image to the $(K+L)^{th}$ frame of image corresponds to the location of the $i^{th}$ image block in the first background frame.

10. The method according to claim 2, wherein after obtaining the first statistical characteristic of the previous K frames of images of the video sequence, the method further comprises:
   obtaining a second statistical characteristic of the $(K+1)^{th}$ frame of image of the video sequence to the $(K+L)^{th}$ frame of image of the video sequence;
   determining a second background frame, wherein the second background frame is used as a reference when encoding is performed on the $(K+L+1)^{th}$ frame of image of the video sequence to the $(K+N)^{th}$ frame of image of the video sequence, wherein N>L+1, and N is a positive integer;
   counting a quantity of times that the $i^{th}$ image block in the first background frame is used as a reference block, wherein the locations of the K image blocks correspond to the location of the $i^{th}$ image block in the first background frame;
   obtaining a probability prediction error according to the first probability and the quantity of times that the $i^{th}$ image block in the first background frame is used as a reference block;
   obtaining, according to the second statistical characteristic, a second probability that the $(K+L+1)^{th}$ frame of image to the $(K+N)^{th}$ frame of image of the video sequence use the second background frame as a reference;
   obtaining, according to the second probability and the probability prediction error, a third probability that each of the $(K+L+1)^{th}$ frame of image of the video sequence to the $(K+N)^{th}$ frame of image of the video sequence uses the second background frame as a reference;
   obtaining, according to the third probability, a QP used for encoding the second background frame;
   encoding the second background frame according to the QP used for encoding the second background frame, to obtain a second background long-term reference frame; and
   encoding the $(K+L+1)^{th}$ frame of image of the video sequence to the $(K+N)^{th}$ frame of image of the video sequence according to the second background long-term reference frame.

11. A video encoding apparatus, comprising:
   a processor; and
   a memory coupled to the processor and having processor-executable instructions stored thereon, which when executed cause the processor to implement operations including:
   obtaining a first statistical characteristic of previous K frames of images of a video sequence, wherein K is a positive integer;
   determining a first background frame, wherein the first background frame is used as a reference when encoding is performed on the $(K+1)^{th}$ frame of image of the video sequence to the $(K+L)^{th}$ frame of image of the video sequence, wherein L is a positive integer;
   determining, according to the first statistical characteristic, a quantization parameter (QP) used for encoding the first background frame;
   encoding the first background frame according to the QP, to obtain a first background long-term reference frame; and
   encoding the $(K+1)^{th}$ frame of image of the video sequence to the $(K+L)^{th}$ frame of image of the video sequence according to the first background long-term reference frame.

12. The apparatus according to claim 11, wherein the operations include:
   obtaining, according to the first statistical characteristic, a first probability that an image block in each of the $(K+1)^{th}$ frame of image of the video sequence to the $(K+L)^{th}$ frame of image of the video sequence uses the first background frame as a reference; and
   obtaining, according to the first probability, the QP used for encoding the first background frame.

13. The apparatus according to claim 11, wherein
   the first statistical characteristic comprises a variance of K centroid values corresponding to K image blocks and an average coding distortion of K coding distortions corresponding to the K image blocks, wherein the K image blocks are image blocks located at same locations in all of the previous K frames of images, the variance of the K centroid values is a variance of a centroid value sequence constituted by the K centroid values, and the average coding distortion of the K coding distortions is an average value of a coding distortion sequence constituted by the K coding distortions.

14. The apparatus according to claim 13, wherein
   the K image blocks are the $i^{th}$ image blocks in all of the previous K frames of images, wherein i is a positive integer; and
   wherein the operations include:
   performing iteration calculation according to an order from the second frame of image of the previous K frames of images to the $K^{th}$ frame of image of the previous K frames of images, to obtain the variance of the K centroid values corresponding to the $i^{th}$ image blocks in all of the previous K frames of images, and the average coding distortion of the K coding distortions corresponding to the $i^{th}$ image blocks in all of the previous K frames of images, wherein the iteration calculation comprises:
   determining whether the $i^{th}$ image block in the $j^{th}$ frame of image of the video sequence belongs to a background region; and
   when the $i^{th}$ image block in the $j^{th}$ frame of image of the video sequence belongs to the background region, obtaining, according to $B_{j,i}=B_{j-1,1}+1$, a quantity $B_{j,i}$ of image blocks that are of previous j image blocks and that belong to the background region, wherein the previous j image blocks are the $i^{th}$ image blocks in all of previous j frames of images of the video sequence; and obtaining, according to $B_{j,i}$, a variance of j centroid values corresponding to the $i^{th}$ image blocks in all of the previous j frames of images and an average coding distortion of j coding distortions corresponding to the $i^{th}$ image blocks in all of the previous j frames of images, wherein K≥j≥2, and when the $i^{th}$ image block in the first frame of image of the video sequence belongs to the background region, $B_{1,i}$ is 1, or when the $i^{th}$ image block in the first frame of image of the video sequence does not belong to the background region, $B_{1,i}$ is 0; or when the $i^{th}$ image block in the $j^{th}$ frame of image of the video sequence does not belong to the background region, obtaining, according to $B_{j,i}=B_{j-1,i}$, a quantity $B_{j,i}$ of image blocks that are of previous j image blocks and that belong to the background region, wherein the previous j image blocks are the $i^{th}$ image blocks in all of previous j frames of images, using a variance of j−1 centroid values corresponding to the $i^{th}$ image blocks in all of previous j−1 frames of images of the video sequence as a variance of j centroid values corresponding to the $i^{th}$ image blocks in all of the previous j frames of images, and using an average coding distortion of j−1 coding distortions corresponding to the $i^{th}$ image blocks in all of the previous j−1 frames of images of the video sequence as an average coding distortion of j coding distortions corresponding to the $i^{th}$ image blocks in all of the previous j frames of images of the video sequence, wherein when j is 2, the variance of the j−1 centroid values corresponding to the $i^{th}$ image blocks in all of the previous j−1 frames of images is a first preset value, and the average coding distortion of the j−1 coding distortions corresponding to the $i^{th}$ image blocks in all of the previous j−1 frames of images is a second preset value or a coding distortion of the first frame of image of the video sequence.

15. The apparatus according to claim 14, wherein the operations include:

determining whether a horizontal component of a minimum motion vector in motion vectors of an image subblock of the $i^{th}$ image block in the $j^{th}$ frame of image is less than a first preset threshold, and whether a vertical component of the minimum motion vector is less than a second preset threshold; and when the horizontal component is less than the first preset threshold, and the vertical component is less than the second preset threshold, determine that the $i^{th}$ image block in the $j^{th}$ frame of image belongs to the background region; or when the horizontal component is not less than the first preset threshold or the vertical component is not less than the second preset threshold, determine that the $i^{th}$ image block in the $j^{th}$ frame of image does not belong to the background region.

16. The apparatus according to claim 14, wherein the operations include:

obtaining a centroid value and a coding distortion of the $i^{th}$ image block in the $j^{th}$ frame of image; obtaining, according to the centroid value of the $i^{th}$ image block in the $j^{th}$ frame of image and $B_{j,i}$, the variance of the j centroid values corresponding to the $i^{th}$ image blocks in all of the previous j frames of images; and obtaining, according to the coding distortion of the $i^{th}$ image block in the $j^{th}$ frame of image and $B_{j,i}$, the average coding distortion of the j coding distortions corresponding to the $i^{th}$ image blocks in all of the previous j frames of images.

17. The apparatus according to claim 16 wherein the operations include obtaining, the average coding distortion of the j coding distortions corresponding to the $i^{th}$ image blocks in all of the previous j frames of images, through the following:

$$e_{j,i}^2 = \begin{cases} d_{j,i}^2, & B_{j,i} = 1 \\ \dfrac{1}{B_{j,i}}((B_{j,i}-1)e_{j-1,i}^2 + d_{j,i}^2), & B_{j,i} > 1 \end{cases},$$

wherein $d_{j,i}^2$ is a coding distortion of the $i^{th}$ image block in the $j^{th}$ frame of image, $e_{j,i}^2$ is an average coding distortion of the previous j image blocks, and $e_{j-1,i}^2$ is an average coding distortion of the previous j−1 image blocks.

18. The apparatus according to claim 14, wherein the operations include:

obtaining the first probability through the following:

$$P_i = \int_{\frac{e_i}{\sigma_i}}^{\frac{e_i}{\sigma_i}} \frac{1}{\sqrt{2\pi}} \exp\left(-\frac{x^2}{2}\right) dx,$$

wherein $P_i$ is a probability that the $i^{th}$ image block in each of the $(K+1)^{th}$ frame of image of the video sequence to the $(K+L)^{th}$ frame of image of the video sequence uses the $i^{th}$ image block in the first background frame as a reference, $$e_i \sqrt{e_{B_{K,i},i}^2},$$

and $$\sigma_i \sqrt{\sigma_{B_{K,i},i}^2},$$

wherein $e_{B_{K,i},i}^2$ is an average coding distortion of the K image blocks, $\sigma_{B_{K,i},i}^2$ is a variance of the K centroid values corresponding to the K image blocks, the K image blocks are the $i^{th}$ image blocks in all of the previous K frames of images, locations of the K image blocks correspond to locations of the $i^{th}$ image blocks in all of the $(K+1)^{th}$ frame of image to the $(K+L)^{th}$ frame of image, the locations of the K image blocks correspond to a location of the $i^{th}$ image block in the first background frame, and i is a positive integer.

19. The apparatus according to claim 12, wherein the operations include:

obtaining, the QP used for encoding the first background frame through the following:

$$QP_i = \begin{cases} \max(QP_{mode} - 3\log_2(KP_i), QP_{min}), & P_i > P_T \\ QP_{mode}, & P_i \le P_T \end{cases},$$

wherein $QP_i$ is a QP used for encoding the $i^{th}$ image block in the first background frame, $P_i$ is the probability that the $i^{th}$ image block in each of the $(K+1)^{th}$ frame of image of the video sequence to the $(K+L)^{th}$ frame of image of the video sequence uses the $i^{th}$ image block in the first background frame as a reference, $P_T$ is a preset value, $QP_{min}$ is a minimum QP value allowed by current encoding, $QP_{code}$ is a minimum value in QPs used by image frames that are in the previous K frames of images of the video sequence and that use a same encoding mode as the first background frame, and a location of the $i^{th}$ image block in each of the $(K+1)^{th}$ frame of image to the $(K+L)^{th}$ frame of image corresponds to the location of the $i^{th}$ image block in the first background frame.

20. The apparatus according to claim 12, wherein the operations include:

obtaining a second statistical characteristic of the $(K+1)^{th}$ frame of image of the video sequence to the $(K+L)^{th}$ frame of image of the video sequence;

determining a second background frame, wherein the second background frame is used as a reference when encoding is performed on the $(K+L+1)^{th}$ frame of image of the video sequence to the $(K+N)^{th}$ frame of image of the video sequence, wherein N>L+1, and N is a positive integer;

counting a quantity of times that the $i^{th}$ image block in the first background frame is used as a reference block, wherein the locations of the K image blocks are corresponding to the location of the $i^{th}$ image block in the first background frame; obtaining a probability prediction error according to the first probability and the quantity of times that the $i^{th}$ image block in the first background frame is used as a reference block; obtaining, according to the second statistical characteristic, a second probability that the $(K+L+1)^{th}$ frame of image to the $(K+N)^{th}$ frame of image of the video sequence use the second background frame as a reference; obtaining, according to the second probability and the probability prediction error, a third probability that each of the $(K+L+1)^{th}$ frame of image of the video sequence to the $(K+N)^{th}$ frame of image of the video sequence uses the second background frame as a reference; and obtaining, according to the third probability, a QP used for encoding the second background frame;

encoding the second background frame according to the QP used for encoding the second background frame, to obtain a second background long-term reference frame; and encoding the $(K+L+1)^{th}$ frame of image of the video sequence to the $(K+N)^{th}$ frame of image of the video sequence according to the second background long-term reference frame.

* * * * *